(12) United States Patent
Ran et al.

(10) Patent No.: US 11,935,402 B2
(45) Date of Patent: *Mar. 19, 2024

(54) AUTONOMOUS VEHICLE AND CENTER CONTROL SYSTEM

(71) Applicant: CAVH LLC, Fitchburg, WI (US)

(72) Inventors: Bin Ran, Fitchburg, WI (US); Yang Cheng, Middleton, WI (US); Tianyi Chen, Fitchburg, WI (US); Shen Li, Madison, WI (US); Jing Jin, Basking Ridge, NJ (US); Xiaoxuan Chen, Madison, WI (US); Fan Ding, Madison, WI (US); Zhen Zhang, Madison, WI (US)

(73) Assignee: CAVH LLC, Fitchburg, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/873,405

(22) Filed: Jul. 26, 2022

(65) Prior Publication Data

US 2022/0406175 A1 Dec. 22, 2022

Related U.S. Application Data

(63) Continuation of application No. 16/509,615, filed on Jul. 12, 2019, now Pat. No. 11,482,102, which is a
(Continued)

(51) Int. Cl.
*G08G 1/01* (2006.01)
*G08G 1/017* (2006.01)
(Continued)

(52) U.S. Cl.
CPC ......... *G08G 1/0145* (2013.01); *G08G 1/0112* (2013.01); *G08G 1/0129* (2013.01);
(Continued)

(58) Field of Classification Search
CPC .. G08G 1/0145; G08G 1/0112; G08G 1/0129; G08G 1/0133; G08G 1/017;
(Continued)

(56) References Cited

U.S. PATENT DOCUMENTS

| 3,824,469 A | 7/1974 | Ristenbatt |
| 4,023,017 A | 5/1977 | Ceseri |

(Continued)

FOREIGN PATENT DOCUMENTS

| CN | 104485003 B | 4/2015 |
| CN | 102768768 B | 3/2016 |

(Continued)

OTHER PUBLICATIONS

Shinya et al., "Semi-Autonomous Adaptive Cruise Control in Mixed Traffic," 2006, Publisher: IEEE.*

(Continued)

*Primary Examiner* — Tuan C To
(74) *Attorney, Agent, or Firm* — Casimir Jones, S.C.; Thomas A. Isenbarger

(57) ABSTRACT

This invention provides a system-oriented and fully-controlled connected automated vehicle highway system for various levels of connected and automated vehicles and highways. The system comprises one or more of: 1) a hierarchical traffic control network of Traffic Control Centers (TCC's), local traffic controller units (TCUs), 2) A RSU (Road Side Unit) network (with integrated functionalities of vehicle sensors, I2V communication to deliver control instructions), 3) OBU (On-Board Unit with sensor and V2I communication units) network embedded in connected and automated vehicles, and 4) wireless communication and security system with local and global connectivity. This system provides a safer, more reliable and more cost-
(Continued)

effective solution by redistributing vehicle driving tasks to the hierarchical traffic control network and RSU network.

20 Claims, 25 Drawing Sheets
(22 of 25 Drawing Sheet(s) Filed in Color)

Related U.S. Application Data continuation of application No. 15/628,331, filed on Jun. 20, 2017, now Pat. No. 10,380,886.

(60) Provisional application No. 62/507,453, filed on May 17, 2017.

(51) Int. Cl.
    *G08G 1/07*           (2006.01)
    *G08G 1/0968*      (2006.01)
    *H04L 67/00*       (2022.01)
    *G08G 1/04*           (2006.01)
    *G08G 1/042*       (2006.01)
    *H04L 67/12*       (2022.01)
    *H04W 84/00*      (2009.01)

(52) U.S. Cl.
    CPC ........... *G08G 1/0133* (2013.01); *G08G 1/017* (2013.01); *G08G 1/07* (2013.01); *G08G 1/0968* (2013.01); *H04L 67/00* (2013.01); *G05D 2201/0213* (2013.01); *G08G 1/04* (2013.01); *G08G 1/042* (2013.01); *H04L 67/12* (2013.01); *H04W 84/005* (2013.01)

(58) Field of Classification Search
    CPC ........ G08G 1/07; G08G 1/0968; H04L 67/00; H04W 84/005
    USPC ........................................................ 701/118
    See application file for complete search history.

(56) References Cited

U.S. PATENT DOCUMENTS

| | | | |
|---|---|---|---|
| 4,962,457 A | 10/1990 | Chen et al. | |
| 5,420,794 A | 5/1995 | James | |
| 5,504,683 A | 4/1996 | Gurmu | |
| 5,625,559 A | 4/1997 | Egawa | |
| 5,732,785 A | 3/1998 | Ran et al. | |
| 6,028,537 A | 2/2000 | Suman et al. | |
| 6,317,682 B1 | 11/2001 | Ogura et al. | |
| 6,829,531 B2 | 12/2004 | Lee | |
| 6,900,740 B2 | 5/2005 | Bloomquist et al. | |
| 7,324,893 B2 | 1/2008 | Yamashita et al. | |
| 7,343,243 B2 | 3/2008 | Smith | |
| 7,382,274 B1 | 6/2008 | Kermani et al. | |
| 7,418,346 B2 | 6/2008 | Breed et al. | |
| 7,421,334 B2 | 9/2008 | Dahlgren et al. | |
| 7,425,903 B2 | 9/2008 | Boss et al. | |
| 7,439,853 B2* | 10/2008 | Tengler ............ G08G 1/096716 | |
| | | | 340/901 |
| 7,554,435 B2 | 6/2009 | Tengler et al. | |
| 7,725,249 B2 | 5/2010 | Kickbusch | |
| 7,860,639 B2 | 12/2010 | Yang | |
| 7,979,172 B2 | 7/2011 | Breed | |
| 8,352,112 B2 | 1/2013 | Mudalige | |
| 8,527,139 B1 | 9/2013 | Yousuf | |
| 8,589,070 B2 | 11/2013 | Ban | |
| 8,630,795 B2 | 1/2014 | Breed et al. | |
| 8,682,511 B2 | 3/2014 | Andreasson | |
| 8,972,080 B2 | 3/2015 | Shida et al. | |
| 9,076,332 B2 | 7/2015 | Myr | |
| 9,120,485 B1 | 9/2015 | Dolgov | |
| 9,349,055 B1 | 5/2016 | Ogale | |
| 9,355,423 B1* | 5/2016 | Slusar ................... G08G 1/0129 | |
| 9,478,129 B1 | 10/2016 | Vaibhavi et al. | |
| 9,494,935 B2 | 11/2016 | Okumura et al. | |
| 9,495,874 B1 | 11/2016 | Zhu et al. | |
| 9,595,190 B2 | 3/2017 | McCrary | |
| 9,646,496 B1* | 5/2017 | Miller ................... H04W 4/029 | |
| 9,665,101 B1 | 5/2017 | Templeton | |
| 9,767,687 B2 | 9/2017 | Gupta et al. | |
| 9,799,224 B2 | 10/2017 | Okamoto | |
| 9,845,096 B2 | 12/2017 | Urano et al. | |
| 9,947,052 B1* | 4/2018 | Slusar ............. G08G 1/096775 | |
| 9,964,948 B2 | 5/2018 | Ullrich et al. | |
| 10,074,223 B2 | 9/2018 | Newman | |
| 10,074,273 B2 | 9/2018 | Yokoyama et al. | |
| 10,262,537 B1 | 4/2019 | Kim et al. | |
| 10,380,886 B2 | 8/2019 | Ran et al. | |
| 10,421,459 B2 | 9/2019 | Goldman-Shenhar et al. | |
| 2002/0008637 A1 | 1/2002 | Lemelson et al. | |
| 2003/0045995 A1* | 3/2003 | Lee ................... G08G 1/096741 | |
| | | | 701/439 |
| 2004/0145496 A1 | 7/2004 | Ellis | |
| 2004/0230393 A1 | 11/2004 | Tzamaloukas | |
| 2005/0209769 A1 | 9/2005 | Yamashita et al. | |
| 2005/0222760 A1 | 10/2005 | Cabral et al. | |
| 2006/0142933 A1 | 6/2006 | Feng | |
| 2006/0226968 A1 | 10/2006 | Tengler et al. | |
| 2006/0251498 A1 | 11/2006 | Buzzoni et al. | |
| 2007/0093997 A1 | 4/2007 | Yang et al. | |
| 2007/0146162 A1 | 6/2007 | Tengler et al. | |
| 2008/0042815 A1 | 2/2008 | Breed et al. | |
| 2008/0095163 A1 | 4/2008 | Chen et al. | |
| 2008/0161986 A1 | 7/2008 | Breed et al. | |
| 2010/0013629 A1 | 1/2010 | Sznaider et al. | |
| 2010/0070167 A1 | 3/2010 | Mudalige | |
| 2010/0256836 A1 | 10/2010 | Mudalige et al. | |
| 2011/0224892 A1 | 9/2011 | Speiser | |
| 2011/0227757 A1 | 9/2011 | Chen et al. | |
| 2012/0022776 A1 | 1/2012 | Razavilar et al. | |
| 2012/0059574 A1* | 3/2012 | Hada ................... G08G 1/0112 | |
| | | | 701/119 |
| 2012/0105639 A1 | 5/2012 | Stein et al. | |
| 2012/0303807 A1 | 11/2012 | Akelbein et al. | |
| 2013/0116915 A1 | 5/2013 | Ferreira et al. | |
| 2013/0137457 A1 | 5/2013 | Potkonjak | |
| 2013/0138714 A1 | 5/2013 | Ricci | |
| 2013/0141580 A1 | 6/2013 | Stein et al. | |
| 2013/0204484 A1 | 8/2013 | Ricci | |
| 2013/0297140 A1 | 11/2013 | Montemerlo et al. | |
| 2013/0297196 A1 | 11/2013 | Shida | |
| 2014/0112410 A1 | 4/2014 | Yokoyama | |
| 2014/0222322 A1 | 8/2014 | Durekovic | |
| 2014/0278026 A1 | 9/2014 | Taylor | |
| 2014/0354451 A1 | 12/2014 | Tonguz et al. | |
| 2015/0006067 A1 | 1/2015 | Lees et al. | |
| 2015/0199685 A1 | 7/2015 | Betancourt et al. | |
| 2015/0211868 A1 | 7/2015 | Matsushita et al. | |
| 2015/0266488 A1 | 9/2015 | Solyom et al. | |
| 2015/0266489 A1 | 9/2015 | Solyom et al. | |
| 2015/0310742 A1 | 10/2015 | Albornoz | |
| 2015/0353094 A1 | 12/2015 | Harda et al. | |
| 2016/0086391 A1 | 3/2016 | Ricci | |
| 2016/0132705 A1* | 5/2016 | Kovarik ................ G05D 1/0261 | |
| | | | 340/10.3 |
| 2016/0142492 A1* | 5/2016 | Fang .................... H04W 4/021 | |
| | | | 370/254 |
| 2016/0216130 A1 | 7/2016 | Abramson et al. | |
| 2016/0231746 A1 | 8/2016 | Hazelton et al. | |
| 2016/0232788 A1 | 8/2016 | Jung et al. | |
| 2016/0325753 A1 | 11/2016 | Stein et al. | |
| 2016/0328272 A1 | 11/2016 | Ahmed et al. | |
| 2017/0039435 A1 | 2/2017 | Ogale et al. | |
| 2017/0053529 A1 | 2/2017 | Yokoyama et al. | |
| 2017/0075195 A1 | 3/2017 | Stein et al. | |
| 2017/0085632 A1 | 3/2017 | Cardote | |
| 2017/0190331 A1 | 7/2017 | Gupta et al. | |
| 2017/0324817 A1 | 11/2017 | Oliveir et al. | |
| 2017/0337571 A1 | 11/2017 | Bansal et al. | |
| 2017/0339224 A1 | 11/2017 | Condeixa et al. | |
| 2017/0345298 A1 | 11/2017 | Tandai et al. | |
| 2017/0357980 A1 | 12/2017 | Bakun et al. | |

(56) References Cited

U.S. PATENT DOCUMENTS

| | | | |
|---|---|---|---|
| 2018/0018216 | A1 | 1/2018 | Halford et al. |
| 2018/0040246 | A1* | 2/2018 | Yonemura .............. G08G 1/164 |
| 2018/0053413 | A1 | 2/2018 | Patil et al. |
| 2018/0151064 | A1* | 5/2018 | Xu ........................ G08G 1/0116 |
| 2018/0158327 | A1* | 6/2018 | Gärtner ................... G08G 1/04 |
| 2018/0262887 | A1 | 9/2018 | Futaki |
| 2018/0299274 | A1 | 10/2018 | Moghe et al. |
| 2018/0308344 | A1* | 10/2018 | Ravindranath ...... G08B 27/001 |
| 2018/0336780 | A1 | 11/2018 | Ran et al. |
| 2019/0096238 | A1 | 3/2019 | Ran et al. |
| 2019/0244518 | A1 | 8/2019 | Yang et al. |
| 2019/0244521 | A1 | 8/2019 | Ran et al. |
| 2022/0289252 | A1* | 9/2022 | Liu .................. G08G 1/096783 |

FOREIGN PATENT DOCUMENTS

| | | | | |
|---|---|---|---|---|
| CN | 107665578 | A | 2/2018 | |
| CN | 107807633 | A | 3/2018 | |
| CN | 108039053 | A | 5/2018 | |
| CN | 108447291 | A | 8/2018 | |
| EP | 2395472 | A1 | 12/2011 | |
| JP | 2017202827 | A | 11/2017 | |
| JP | 2017211366 | A | 11/2017 | |
| KR | 20170126293 | A | 11/2017 | |
| WO | WO-2012033706 | A2 * | 3/2012 | ........... G08G 1/0112 |
| WO | WO 2015/114592 | A1 | 8/2015 | |
| WO | WO 2015/180090 | | 12/2015 | |
| WO | WO 2017/079474 | A2 | 5/2017 | |
| WO | WO 2018/132378 | | 7/2018 | |
| WO | WO 2019/156955 | A1 | 8/2019 | |
| WO | WO 2019/156956 | A1 | 8/2019 | |

OTHER PUBLICATIONS

Tiago et al., "Traffic Sign Recognition for Autonomous Driving Robot," 2014, Publisher: IEEE.*

Examination Report No. 1 for AU App. No. 2018208404, dated Oct. 21, 2022, 3 pages.

APGDT002, Microchip Technology Inc. http://www.microchip.com/, retrieved on: Nov. 3, 2017, 2 pages.

Bergenhem et al. "Overview of Platooning Systems", ITS World Congress, Vienna, Oct. 22-26, 2012, 8 pages.

Christopher et al. Radio Tomography for Roadside Surveillance. 2014. vol. 8, Publisher: IEEE.

Conduent™—Toll Collection SolutionsConduent™—Toll Collection Solutions, https://www.conduent.com/solution/transportation-solutions/electronic-toll-collection/, retrieved on: Nov. 3, 2017, 3 pages.

EyEQ4 from Mobileye, http://www.mobileye.com/our-technology, retrieved on Nov. 3, 2017, 6 pages.

Fehr-Peers "Effects of Next Generation Vehicles on Travel Demand and Highway, Capacity," FP Think: Effects of Next-Generation Vehicles on Travel Demand and Highway Capacity Feb. 2014, [retrieved on Jun. 13, 2019]. Retrieved from the Internet: <URL:http://www.fehrandpeers.com/wp-content/uploads/2015/07/FP_Thing_Next_Gen_White_Paper_FINAL.pdf>pp. 1-39.

Fleetmatics https://www.fleetmatics.com/, retrieved on: Nov. 3, 2017, 6 pages.

HDL-64E of Velodyne Lidar, http://velodynelidar.com/index.html, retrieved on: Nov. 3, 2017, 10 pages.

Here, https://here.com/en/products-services/products/here-hd-live-map, retrieved on: Nov. 3, 2017, 5 pages.

Marketa et al. Fully Automatic Roadside Camera Calibration for Traffic Surveillance. 2015, vol. 16, Publisher: IEEE.

Miami Dade Transportation Planning Organization "First Mile-Last Mile Options with Hight Trip Generator Employers." MiamiDadeTPO.org. pp. 1-99 Jan. 31, 2018, [retrieved on Jun. 13, 2019]. Retrieved from the Internet :<URL:http://www.miamidadetpo.org/library/studies/first-mile-last-mile-options-with-high-trip-generator-employers-2017-12.pdf>.

MK5 V2X , Cohda Wireless, http://cohdawireless.com, retrieved on: Nov. 3, 2017, 2 pages.

Optical Fiber from Cablesys, https://www.cablesys.com/fiber-patch-cables/?gclid=Cj0KEQjwldzHBRCfg_almKrf7N4BEiQABJTPKH_q2wbjNLGBhBVQVSBogLQMkDaQdMm5rZtyBaE8uuUaAhTJ8P8HAQ, retrieved on: Nov. 3, 2017, 10 pages.

Products for Toll Collection—Mobility—SiemensProducts for Toll Collection—Mobility—Siemens, https://www.mobility.siemens.com/mobility/global/en/urban-mobility/road-solutions/toll-systems-for-cities/products-for-toll-collection/pages/products-for-toll-collection.aspx, retrieved on: Nov. 3, 2017, 2 pages.

Portland "Portland Metro Area Value Pricing Feasibility Analysis" Oregon Department of Transportation, Jan. 23, 2018, pp. 1-29, [retrieved on Jun. 13, 2019]. Retrieved from the Internet: <URL:https://www.oregon.gov/ODOT/KOM/VP-TM2-InitialConcepts.PDF>.

R-Fans_16 from Beijing Surestar Technology Co. Ltd, http://www.isurestar.com/index.php/en-product-product.html#9, retrieved on: Nov. 3, 2017, 7 pages.

Society of Automotive Engineers International's new standard J3016: "Taxonomy and Definitions for Terms Related to On-Road Motor Vehicle Automated Driving Systems" Issued Jan. 2014, downloaded Sep. 17, 2019, 12 pages.

Society of Automotive Engineers International's new standard J3016: "(R) Taxonomy and Definitions for Terms Related to Driving Automation Systems for On-Road Motor Vehicles" Revised Sep. 2016, downloaded Dec. 12, 2016, 30 pages.

STJ1-3 from Sensortech, http://www.whsensortech.com/, retrieved on Nov. 3, 2017, 2 pages.

StreetWAVE from Savari, http://savari.net/technology/road-side-unit, retrieved on: Nov. 3, 2017, 2 pages.

TDC-GPX2 LIDAR of precision-measurement-technologies, http://pmt-fl.com, retrieved on: Nov. 3, 2017, 2 pages.

Teletrac Navman http://drive.teletracnavman.com/, retrieved on: Nov. 3, 2017, 2 pages.

Vector CANalyzer9.0 from vector https://vector.com, retrieved on Nov. 3, 2017, 1 page.

Williams "Transportation Planning Implications of Automated/Connected Vehicles on Texas Highways" Texas A&M Transportation Institute, Apr. 2017, 34 pages.

International Search Report of related PCT/US2018/012961, dated May 10, 2018, 16 pages.

International Search Report of related PCT/US2019/016606, dated Apr. 23, 2019, 21 pages.

International Search Report of related PCT/US2019/016603, dated Apr. 24, 2019, 17 pages.

International Search Report of related PCT/US2019/031304, dated Aug. 9, 2019, 17 pages.

International Search Report of related PCT/US2019/026569, dated Jul. 8, 33 pages.

International Search Report of related PCT/US2019/037963, dated Sep. 10, 2019, 54 pages.

* cited by examiner

AUTONOMOUS VEHICLE AND CENTER CONTROL SYSTEM

The present application is a continuation of U.S. patent application Ser. No. 16/509,615, filed Jul. 12, 2019, which is a continuation of U.S. patent application Ser. No. 15/628,331, filed Jun. 20, 2017, now U.S. Pat. No. 10,380,886, issued on Aug. 13, 2019, which claims priority to U.S. Provisional Patent Application Ser. No. 62/507,453, filed May 17, 2017, each of which is herein incorporated by reference in its entirety.

FIELD

The present invention relates generally to a comprehensive system providing full vehicle operations and control for connected and automated vehicles (CAV), and, more particularly, to a system controlling CAVs by sending individual vehicles with detailed and time-sensitive control instructions for vehicle following, lane changing, route guidance, and related information.

BACKGROUND

Autonomous vehicles, vehicles that are capable of sensing their environment and navigating without or with reduced human input, are in development. At present, they are in experimental testing and not in widespread commercial use. Existing approaches require expensive and complicated onboard systems, making widespread implementation a substantial challenge.

SUMMARY

The present invention provides a comprehensive system providing full vehicle operations and control for connected and automated vehicle and highway systems by sending individual vehicles with detailed and time-sensitive control instructions. It is suitable for a portion of lanes, or all lanes of the highway. Those instructions are vehicle specific and they are sent by lowest level traffic control units (TCUs), which are optimized and passed from top level traffic control centers (TCCs). These TCC/TCUs are in a hierarchical structure and cover different levels of areas.

In some embodiments, the systems and methods provide a transportation management system, or use thereof, that provides full vehicle operations and control for connected and automated vehicle and highway systems by sending individual vehicles with detailed and time-sensitive control instructions for one or more or all of vehicle following, lane changing, route guidance, and related information. In some embodiments, the systems and methods comprise one or more or all of: a) a hierarchy of traffic control centers/units (TCCs/TCUs), that process information and give traffic operations instructions, wherein said TCCs and TCUs are automatic or semi-automated computational modules that focus on data gathering, information processing, network optimization, and traffic control; b) a network of Road Side Units (RSUs), that receive data flow from connected vehicles, detect traffic conditions, and send targeted instructions to vehicles, wherein, in some embodiments, said RSU network focuses on data sensing, data processing, control signal delivery, and information distribution, and point or segment TCUs can be combined or integrated with a RSU; c) a vehicle sub-system housed on one or more vehicles, collectively comprising, for example, a mixed traffic flow of vehicles at different levels of connectivity and automation; and d) communication systems, that provide wired and wireless communication services to one or more or all the entities in the system.

One or more entities may manage, control, or own one or more of the components. Entities include individuals in vehicles, private and public transportation agencies, communication providers, and third party managers. Individually managed components may be configured to communication with and control or be controlled by one or more other components. For example, an autonomous vehicle control system housed in a vehicle may comprise one or more or all of: a) a communication link with a hierarchy of traffic control centers/units (TCCs/TCUs), which process information and give traffic operations instructions, wherein said TCCs and TCUs are automatic or semi-automated computational modules that focus on data gathering, information processing, network optimization, and traffic control; b) a communication link with network of Road Side Units (RSUs), which receive data flow from connected vehicles, detect traffic conditions, and send targeted instructions to vehicles, wherein said RSU network focuses on data sensing, data processing, control signal delivery, and information distribution, and said point or segment TCU can be combined or integrated with a RSU; and a vehicle sub-system, configured to receive detailed and time-sensitive control instructions for vehicle following, lane changing, route guidance, and related information.

In some embodiments, the systems and methods are configured to be operational on a portion of the available lane(s), or all the lanes of a road or highway.

In some embodiments, information is customized for each individual vehicle served by the system; said information including one or more or all of: weather, pavement conditions, and estimated travel time; and said information including vehicle control instructions including one or more or all of speed, spacing, lane designation, and routing.

In some embodiments, information is sent from an upper level TCC/TCU to a lower level TCC/TCUs, and includes one or more or all of: a desirable speed, a desirable spacing of vehicles, a desirable traffic volume, a desirable traffic split at access points, and traffic signal timing parameters.

In some embodiments, the system employs hardware comprising one or more or all of: a power supply, traffic sensors, wired and wireless communication modules, and a data storage device and database.

In some embodiments, the systems and methods are configured for use with a sensor selected from the group consisting of: a microwave system; an inductive loop system; an inferred system; a video camera system; and a laser system.

In some embodiments, the systems and methods comprise a hierarchy of Traffic Control Centers/Units (TCCs/TCUs) comprising one or more of: Macroscopic TCCs, that process information from regional TCCs and provide control targets to regional TCCs; Regional TCCs, that process information from corridor TCCs and provide control targets to corridor TCCs; Corridor TCCs, that process information from Macroscopic and segment TCUs and provide control targets to segment TCUs; Segment TCUs, that process information from corridor/point TOCs and provide control targets to point TCUs; and Point TCUs, that process information from the segment TCU and RSUs and provide vehicle-based control instructions to RSU.

In some embodiments, the Macroscopic TCC: provides control target to Regional TCCs; collects related data from regional TCCs; archives historical data in a data center, to support information processing and a strategy optimizer;

provides an automatic or semi-automated computational center that focuses on data gathering, information processing, network optimization, and traffic control signals; and controls multiple regional TCCs in a large scale area and communicates with regional TCCs using high volume capacity and low latency communication media, such as optical fiber.

In some embodiments, the Regional TCC: provides control target to corridor TCCs; collects related data from corridor TCCs; archives historical data in a data center, to support the information processing and a strategy optimizer; provides an automatic or semi-automated computational center that focuses on data gathering, information processing, network optimization, and traffic control signals for a region such as a city; and controls multiple Corridor TCCs within its coverage, communicates with corridor TCCs and the upper level macroscopic TCC using high volume capacity and low latency communication media, such as optical fiber.

In some embodiments, the Corridor TCC: provides control target to segment TCUs; collects related data from segment TCUs; provides optimizer and processor modules to process information and provide control targets; provides an automatic or semi-automated computational center that focuses on data gathering, information processing, network optimization, and traffic control signals for a long roadway corridor, such as a 10-mile long freeway stretch plus local road in the vicinity; and contains a calculation server, a data warehouse, and data transfer units, with image computing ability calculating the data collected from road controllers, and controls Segment TCCs within its coverage, wherein a traffic control algorithm of TCC is used to control Point TCCs (e.g. adaptive predictive traffic control algorithm), a Corridor TCC communicates with segment TCUs and its upper Regional TCC using high volume capacity and low latency communication media, such as optical fiber, and said corridor TCC covers 5-20 miles (or longer or shorter distances).

In some embodiments, the Segment TCU: provides control target to point TCUs; collects related data from point TCUs; provides optimizer and processor modules to process information and provide control targets; provides a smaller traffic control unit covering a small roadway area, and covers a road segment about 1 to 2 miles (or longer or shorter distances); and contains LAN data switching system (e.g., Cisco Nexus 7000) and an engineer server (e.g. IBM engineer server Model 8203 and ORACL data base), and communicates with Point TCC either by wired or wireless communication media.

In some embodiments, the Point TCU: provides vehicle based control instructions to RSUs; collects related data from point RSUs; provides optimizer and processor modules to process information and provide control targets; and provides a smaller traffic control unit covering a short distance of a roadway (e.g., 50 meters), ramp metering, or intersections, which are installed for every ramp or intersection; and is connected with a number of RSU units, e.g., ten units (e.g., 1, 2, 3, 4, 5, 6, 7, 8, 9, 10, 12, 15, 20, etc.).

In some embodiments, the RSUs comprise one or more or all of: a sensing module that gathers traffic and related information; a data processing module that provides vehicle-specific measurements, including but not limited to speed, headway, acceleration/deceleration rate, the distance between carriageway markings and vehicles, angle of vehicles and central lines, and overall traffic status; a communication module that sends information between vehicles and upper level point TCU; a communication module that sends vehicle-specific driving instructions to vehicles; an interface module that shows data that is sent to an OBU system; and a power supply unit.

In some embodiments, a vehicle sub-system comprises one or more modules for: a) vehicle-control; b) traffic detection and data collection; c) wireless communication; and d) data collection and communication.

In some embodiments, the system is configured to redistribute essential vehicle driving tasks among vehicles comprising one or more or all of: providing instructions needed for navigation tasks to the vehicles; providing instructions and information for guidance tasks of: safety maintenance, traffic control/road condition, and special information; fulfilling vehicle maneuver tasks, and monitoring safety maintenance tasks, to take over if the system fails; providing data feeds for information exchange tasks at the control level, which is usually provided by the vehicle sensors in a vehicle; fulfilling vehicle control tasks, at the mechanic level, and monitoring surroundings, and standing-by as a backup system; providing vehicles with driving-critical information, some of which are difficult and expensive for vehicle-based sensors to obtain in a constantly reliable way; and fulfilling driving tasks and using each other as the backup in case of any errors or failures.

In some embodiments, the systems and methods comprise an in-vehicle interface selected from the group consisting of: audio: Voice control and Text-to-Voice; vision: Head-up-display (HUD); and vibration.

In some embodiments, the vehicle identification and tracking functions operate on any or any combination of: CV security certificate; on Board Unit (OBU) ID; mobile device ID; DGPS (differential GPS); vision sensors in combination with video recognition and object detection; and mobile LiDAR sensors.

In some embodiments, the systems and methods employ one or more communication systems selected from the group consisting of: OEM operators, such as OnStar; wireless communication service providers, such as ATT and Verizon; and public agencies who maintain the system, such as a DOT who owns optic fiber networks.

In some embodiments, the systems and method employ a communication technology selected from the group consisting of: wireless communication technologies, such as DSRC, Cellular 3G, 4G, 5G, Bluetooth; and cable communication technologies, such as Ethernet.

Thus, in some embodiments, provided herein are multi-dimensional connected and automated vehicle-highway systems, comprising hardware and software, said system comprising three dimensions: Dimension 1 (D1): vehicle automation of connected and automated vehicles; Dimension 2 (D2): connectivity of communication among humans, vehicles, and traffic environments; and Dimension 3 (D3): transportation system integration.

In some embodiments, D1 comprises one or more capabilities of: a) driver assistance employing a driving mode-specific execution by a driver assistance system of either steering or acceleration/deceleration using information about a driving environment and with an expectation that a human driver perform all remaining aspects of a dynamic driving task; b) partial automation employing a driving mode-specific execution by one or more driver assistance system of both steering and acceleration/deceleration using information about the driving environment and with an expectation that the human driver perform all remaining aspects of the dynamic driving task; c) conditional automation employing driving mode-specific performance by an automated driving system of all aspects of the dynamic driving task with an expectation that the human driver will respond appropriately to a request to intervene; d) high automation employing driving mode-specific performance by an automated driving system of all aspects of the dynamic driving task, even if the human driver does not respond appropriately to the request to intervene; and e) full automation employing full-time performance by an automated driving system of all aspects of the dynamic driving task under all roadway and environmental conditions that can be managed by a human driver.

In some embodiments, D2 comprises one or more capabilities of: a) information assistance, wherein a human driver receives simple traffic condition information from roadside units to assist driving and decision making; b) limited connected sensing, wherein the human driver and vehicle can access information via onboard unit and roadside units to better assist driving and decision making compared with the information assistance of a); c) redundant information sharing, wherein the human driver and vehicle can access multiple layers of information via on-board unit, roadside units, Traffic Operation Center (TOC), and vehicles, wherein vehicles are operated through various controlling strategies and methods, including human driving, vehicle automated driving, and TOC controlled driving; d) optimized connectivity, wherein information on the transportation network is not overloaded and redundant and wherein optimized information with reduced redundancy is provided to drivers and vehicles to facilitate optimized and safe driving.

In some embodiments, D3 comprises one or more capabilities of: a) key point system integration, wherein connected vehicles exchange information with roadside units at traffic key points (e.g., road intersections), obtain vehicle control instructions and other information to address local issues and keep smooth and safe traffic movement; b) segment system integration, wherein connected vehicles receive specific control instructions and information from a microscopic TOC to manage and control traffic of a specific road segment; c) corridor system integration, wherein connected vehicles receive navigation instructions from a macroscopic TOC (e.g., that manages citywide or statewide traffic) that controls the traffic volume, predicts traffic congestions, and proposes to the macroscopic TOC for global optimization; and d) macroscopic system integration, wherein a macroscopic TOC optimizes traffic distractions from a highest level to increase traffic efficiency, lower traffic costs of people and goods, and realize global optimization for a whole network.

In some embodiments, levels of system integration, automation, and connectivity, comprise: 1) Vehicle Automation Level, which uses the SAE definition; 2) Connectivity Level, which is defined based on information volume and content: (e.g., C0: No Connectivity: both vehicles and drivers do not have access to any traffic information; C1: Information assistance: vehicles and drivers can only access simple traffic information from the Internet, such as aggregated link traffic states, and information is of certain accuracy, resolution, and of noticeable delay; C2: Limited connected sensing: vehicles and drivers can access live traffic information of high accuracy and unnoticeable delay, through connection with RSUs, neighboring vehicles, and other information providers (however, the information may not be complete); C3: Redundant Information Sharing: vehicles and drivers can connect with neighboring vehicles, traffic control device, live traffic condition map, and high-resolution infrastructure map (information is with adequate accuracy and almost in real time, complete but redundant from multiple sources); and C4: Optimized connectivity: optimized information is provided and smart infrastructure can provide vehicles with optimized information feed); and 3) Transportation System Integration Level, which is defined by the levels of system coordination/optimization (e.g., S0: No integration; S1: Key point system integration, covering a small area such as intersections, ramp metering, and only for the major travel mode; S2: Segment system integration, covering a short road segment such as a freeway segment between two ramp access points, and for most of the travel modes; S3: corridor system integration, covering a corridor with connecting roads and ramps, and for all coexisting traffic modes; S4: Regional system integration, covering a city or urban area; and S5: Macroscopic system integration, covering several regions and inter-regional traffic.

Also provided herein are methods employing any of the systems described herein for the management of one or more aspects of traffic control. The methods include those processes undertaken by individual participants in the system (e.g., drivers, public or private local, regional, or national transportation facilitators, government agencies, etc.) as well as collective activities of one or more participants working in coordination or independently from each other.

DRAWINGS

The patent or application file contains at least one drawing executed in color. Copies of this patent or patent application publication with color drawings will be provided by the Office upon request and payment of the necessary fee.

FIG. 1 presents an exemplary system overview.

FIG. 2 presents an exemplary definition of a 3D CAVH (Connected Automated Vehicle Highway) system;

FIG. 3 illustrates an exemplary redistribution of driving tasks;

FIG. 4 provides a distribution of driving tasks for a typical AV (Automated Vehicle) based system;

Figure 25:
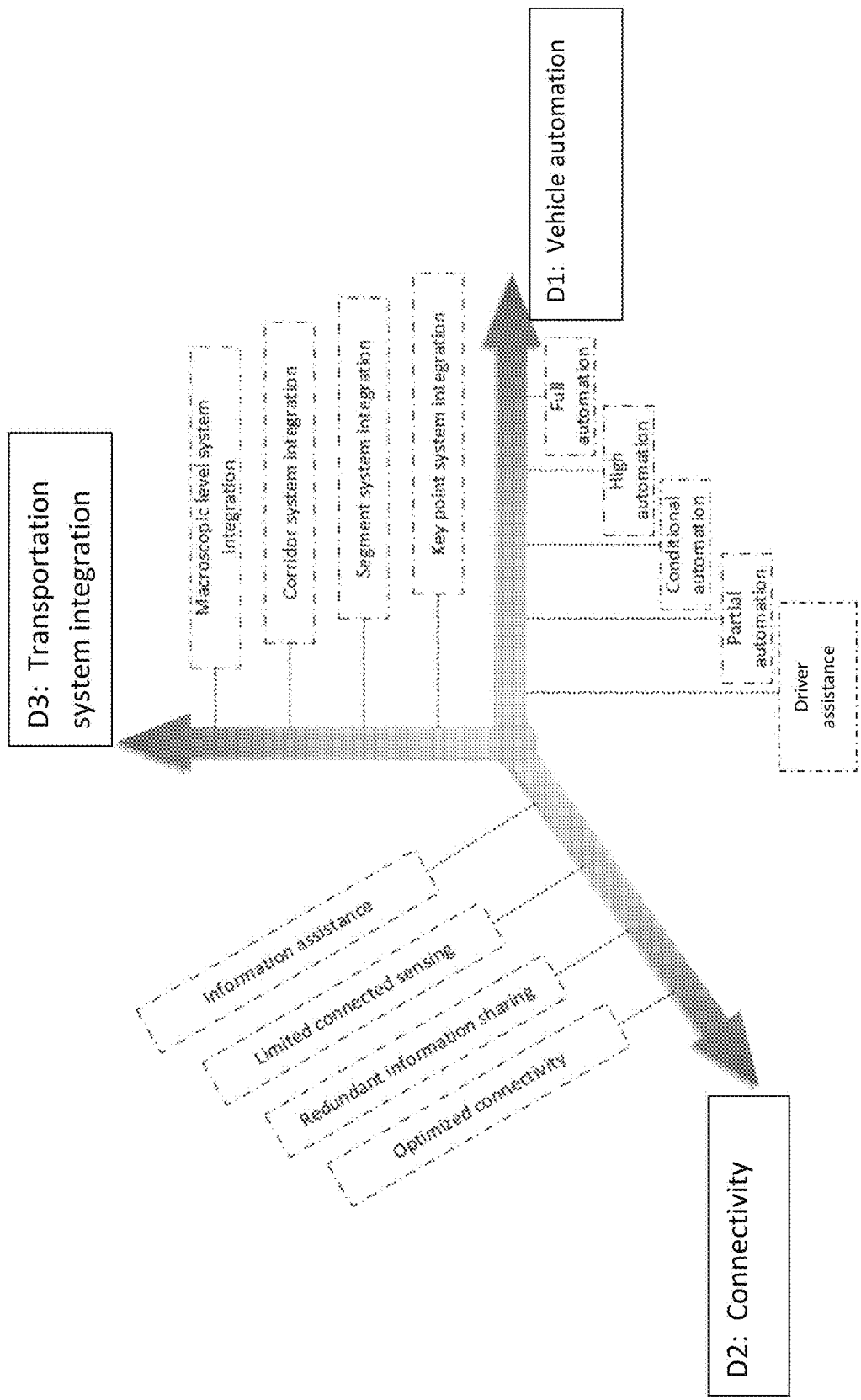

FIG. 25 presents an exemplary definition of a 3D CAVH (Connected Automated Vehicle Highway) system.

DETAILED DESCRIPTION

Exemplary embodiments of the technology are described below. It should be understood that these are illustrative embodiments and that the invention is not limited to these particular embodiments.

Legend
- 101—TCC&TCU subsystem: A hierarchy of traffic control centers (TCCs) and traffic control units (TCUs), which process information and give traffic operations instructions. TCCs are automatic or semi-automated computational centers that focus on data gathering, information processing, network optimization, and traffic control signals for regions that are larger than a short road segment. TCUs (also referred to as point TCU) are smaller traffic control units with similar functions, but covering a small freeway area, ramp metering, or intersections.
- 102—RSU subsystem: A network of Roadside Units (RSUs), which receive data flow from connected vehicles, detect traffic conditions, and send targeted instructions to vehicles. The RSU network focuses on data sensing, data processing, and control signal delivery. Physically, e.g. a point TCU or segment TCC can be combined or integrated with a RSU.
- 103—vehicle subsystem: The vehicle subsystem, comprising a mixed traffic flow of vehicles at different levels of connectivity and automation.
- 104—Communication subsystem: A system that provides wired/wireless communication services to some or all the entities in the systems.
- 105—Traffic data flow: Data flow contains traffic condition and vehicle requests from the RSU subsystem to TCC & TCU subsystem, and processed by TCC & TCU subsystem.
- 106—Control instructions set flow: Control instructions set calculated by TCC & TCU subsystem, which contains vehicle-based control instructions of certain scales. The control instructions set is sent to each targeted RSU in the RSU subsystem according to the RSU's location.
- 107—Vehicle data flow: Vehicle state data and requests from vehicle subsystem to RSU subsystem.
- 108—Vehicle control instruction flow: Flow contains different control instructions to each vehicle (e.g. advised speed, guidance info) in the vehicle subsystem by RSU subsystem.
- 301—Macroscopic Traffic Control Center: Automatic or semi-automated computational center covering several regions and inter-regional traffic control that focus on data gathering, information processing, and large-scale network traffic optimization.
- 302—Regional Traffic Control Center: Automatic or semi-automated computational center covering a city or urban area traffic control that focus on data gathering, information processing, urban network traffic and traffic control signals optimization.
- 303—Corridor Traffic Control Center: Automatic or semi-automated computational center covering a corridor with connecting roads and ramps traffic control that focus on corridor data gathering, processing, traffic entering and exiting control, and dynamic traffic guidance on freeway.
- 304—Segment Traffic Control Center: Automatic or semi-automated computational center covering a short road segment Traffic control that focus on segment data gathering, processing and local traffic control.
- 305—Point Traffic Control Unit: covering a small freeway area, ramp metering, or intersections that focus on data gathering, traffic signals control, and vehicle requests processing.
- 306—Road Side Unit: receive data flow from connected vehicles, detect traffic conditions, and send targeted instructions to vehicles. The RSU network focuses on data sensing, data processing, and control signal delivery.
- 307—Vehicle subsystem: comprising a mixed traffic flow of vehicles at different levels of connectivity and automation.
- 401—Macro control target, neighbor Regional TCC information.
- 403—Regional control target, neighbor Corridor TCC information.
- 405—Corridor control target, neighbor Segment TCU information.
- 407—Segment control target, neighbor Point TCU information.
- 402—Regional refined traffic conditions, metrics of providing assigned control target.
- 404—Corridor refined traffic conditions, metrics of providing assigned control target.
- 406—Segment refined traffic conditions, metrics of providing assigned control target.
- 408—Point refined traffic conditions, metrics of providing assigned control target.
- 601—Vehicle Static & Dynamic Information:
 (1) Static Information
 1. Vehicle ID;
 2. Vehicle size info;
 3. Vehicle type info (including vehicle max speed, acceleration, and deceleration);
 4. Vehicle OBU info (Software information, Hardware information): Software of the OBU is designed in such a way that no user input is required and it can be seamlessly engaged with the portable RSU via Vehicle-to-Infrastructure (V2I) or Vehicle-to-Vehicle (V2V) communication, or both. The OBU hardware contains DSRC radio communication (or other communication technology) capability as well as Global Positioning System technology as compared with the RSU, which only needs to have DSRC radio communication (or other communication technology) capability.
 (2) Dynamic Information
 1. Timestamp;
 2. Vehicle lateral/longitudinal position;
 3. Vehicle speed;
 4. Vehicle OD information (including origin information, destination information, route choice information);
 5. Other vehicle necessary state info.
- 602—Vehicle control instructions:
 (1) Vehicle control instructions
 1. Lateral/Longitudinal position request at certain time;
 2. Advised speed;
 3. Steering and control info.
 (2) Guidance Information
 1. Weather;
 2. Travel time/Reliability;
 3. Road guidance.
- 701—Department of Transportation owned;
- 702—Communication Service Provider (CSP);
- 703—OEM;
- 801—Optimizer: Producing optimal control strategy, etc.;
- 802—Processor: Processing the data received from RSUs.

Figure 1:
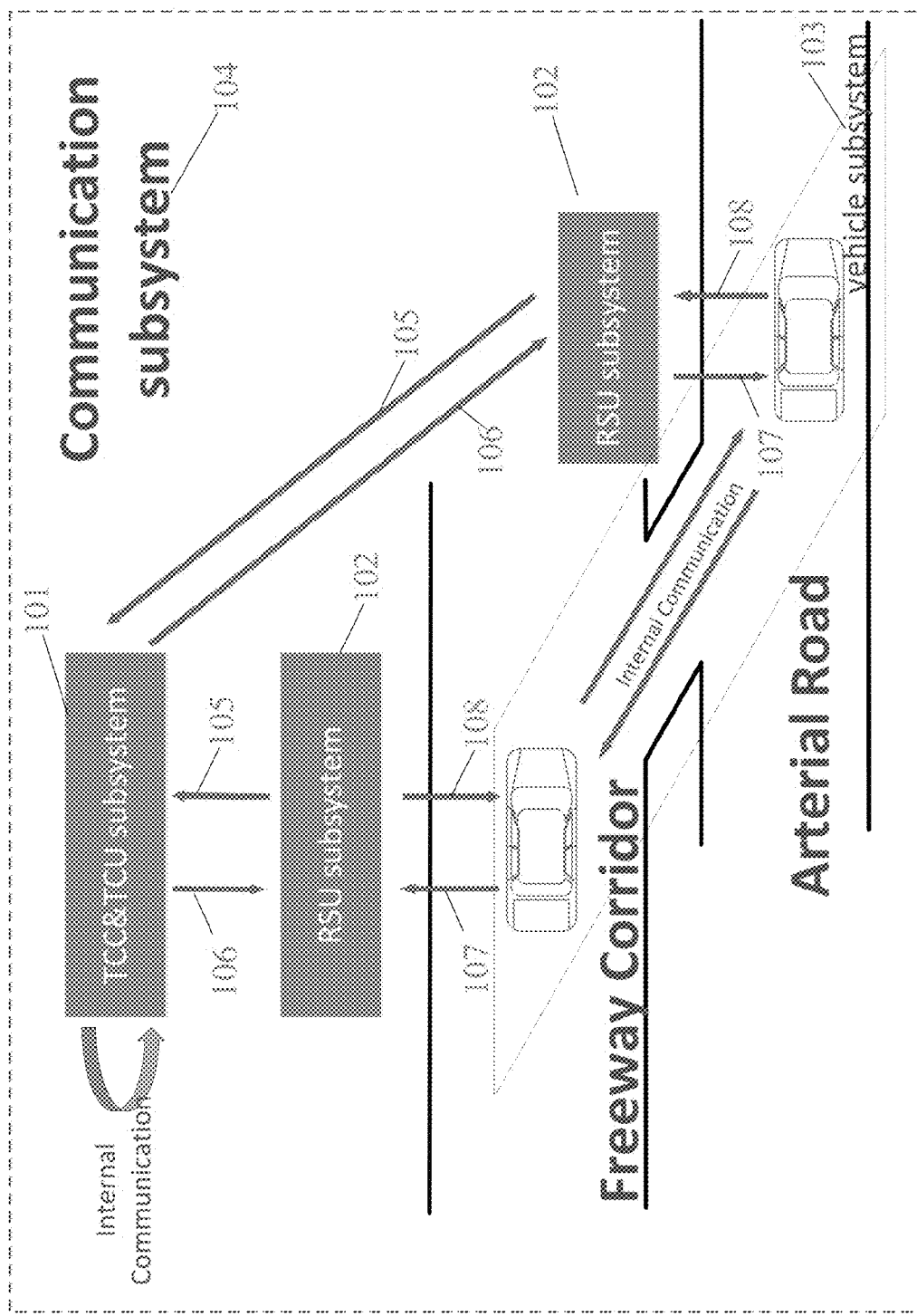

In some embodiments, as shown in FIG. 1, the system contains TCC/TCU subsystem 101, RSU subsystem 102, vehicle subsystem 103, and communication subsystem 104. TCC/TCU subsystem 101 is a hierarchical traffic control network of Traffic Control Centers (TCCs) and local traffic controller units (TCUs), which process traffic information from RSU subsystem 102 and give traffic operation instructions to RSU subsystem 102. RSU subsystem 102 is a network of Roadside Units, which process traffic detection, communication, control instructions, and emissions. Vehicle subsystem 103 is a mixed traffic flow of vehicles at different levels of connectivity and automation, which send static, dynamic information and requests of vehicles to RSU subsystem 102, and receive instructions from RSU subsystem. RSU subsystem 102 transfers vehicle data and requests from vehicle subsystem 103 into traffic information, and sends it to TCC/TCU subsystem 101 by communication system 104. TCC/TCU subsystem 101 processes the information in the proper layer and sends operation instructions back to RSU subsystem 102. RSU subsystem 102 screens and catalogues the operation instructions and sends the instructions 108 to each vehicle (e.g. advised speed, guidance information). Communication subsystem 104 is a wireless communication and security system with local and global connectivity, providing wired and wireless communication services to all the entities in the systems.

Figure 2:
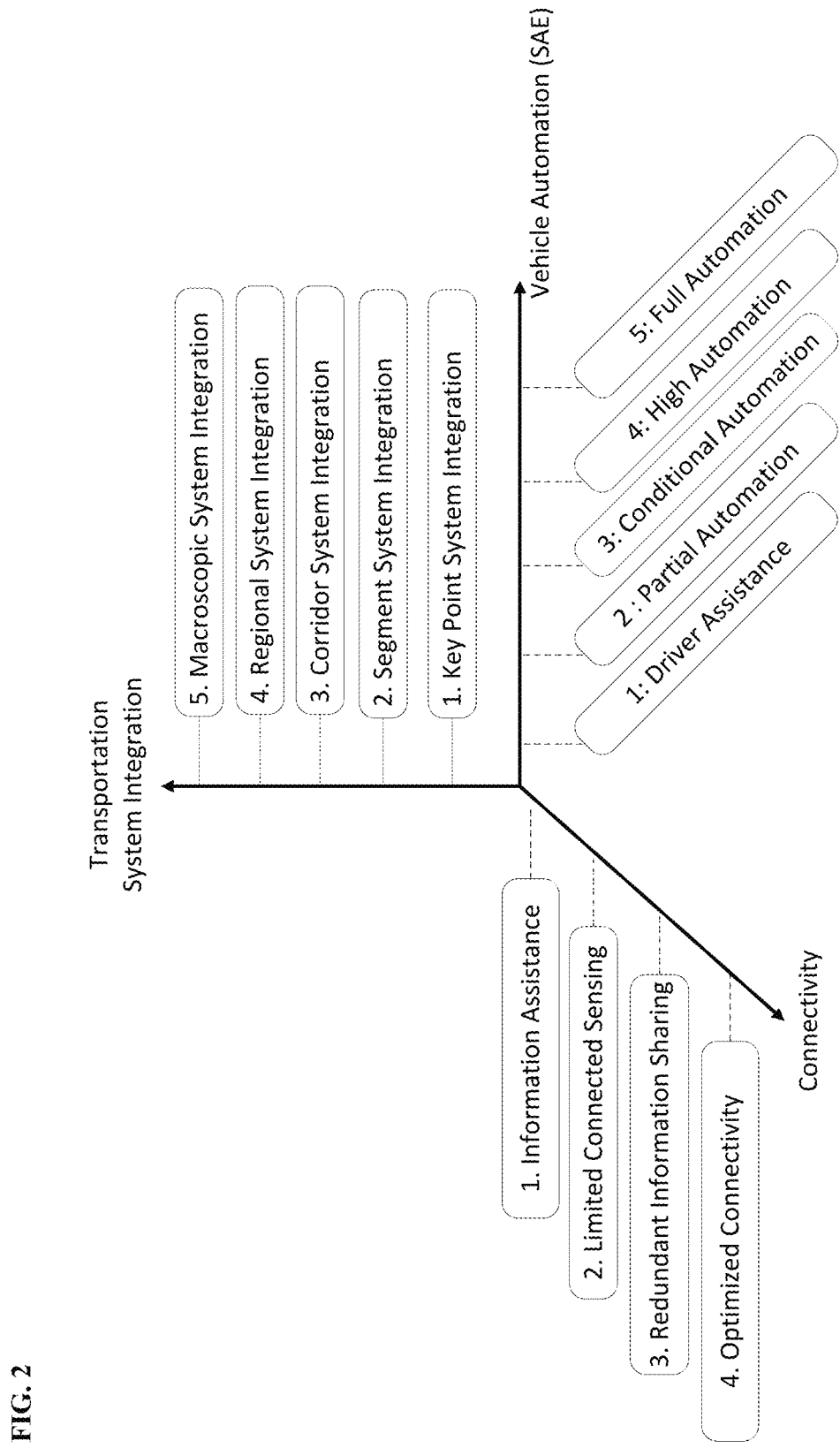

As shown in FIG. 2 (a), the attributes of such a system, regarding levels of system integration, automation, and connectivity, is defined as:

i. Vehicle Automation Level uses the SAE definition.
ii. Connectivity Level is defined based on information volume and content:
 1. C0: No Connectivity
    Both vehicles and drivers do not have access to any traffic information.
 2. C1: Information Assistance
    Vehicles and drivers can only access simple traffic information from the Internet, such as aggregated link traffic states. Information is of certain accuracy, resolution, and of noticeable delay.
 3. C2: Limited Connected Sensing
    Vehicles and drivers can access live traffic information of high accuracy and unnoticeable delay, through connection with RSUs, neighbor vehicles, and other information providers. However, the information may not be complete.
 4. C3: Redundant Information Sharing
    Vehicles and drivers can connect with neighbor vehicles, traffic control device, live traffic condition map, and high-resolution infrastructure map. Information is with adequate accuracy and almost in real time, complete but redundant from multiple sources.
 5. C4: Optimized Connectivity
    Vehicles and drivers are provided with optimized information. Smart infrastructure can provide vehicles with optimized information feed.
iii. System Integration Level is defined based on coordination/optimization scope:
 1. S0: No Integration
    There is no integration between any systems.
 2. S1: Key Point System Integration (e.g., RSU based control for intersections, ramp metering)
    System integration occurs at intersection or ramp metering area. However, coordination/optimization scope is very small.
 3. S2: Segment System Integration (e.g., optimizing traffic on University Ave. within the campus)
    Scope becomes larger and more RSUs and vehicles are involved in the coordination and optimization. The traffic modes will remain the same.
 4. S3: Corridor System Integration (e.g., highway and local street integration, across different traffic modes)
    Coordination and optimization will cross different traffic modes and a whole freeway or arterial will be considered. RSUs and vehicles by share the information with each other will achieve system optimal in target scope.
 5. S4: Macroscopic System Integration (e.g., city or statewide) City or statewide coordination and optimization is achieved by connecting RSUs and vehicles in very large scope.

Unless specified otherwise, any of the embodiments described herein may be configured to operate with one or more of the Connectivity Levels in each combination with one or more of the System Integration Levels.

For example, in some embodiments, provided herein is a three-dimensional connected and automated vehicle-highway system (see e.g., FIG. 25). The exemplary system in FIG. 25 includes three dimensions: Dimension 1 (D1): vehicle automation, defines the development stages of connected and automated vehicles, adopting the SAE vehicle automation definition (e.g., driver assistance, partial automation, conditional automation, high automation, and full automation). Dimension 2 (D2): connectivity, defines the development stages of communication technologies, is about the communication among human, vehicles, and the traffic environment (e.g., information assistance, limited connected sensing, redundant information sharing, and optimized connectivity). Dimension 3 (D3): transportation system integration, defines the development stages of transportation system (e.g., key point system integration, segment system integration, corridor system integration, and macroscopic level system integration). This system provides a comprehensive system for the connected and automated vehicles and highways, by integrating, coordinating, controlling, managing, and optimizing all related vehicles, information services, facilities, and systems.

Figure 3:
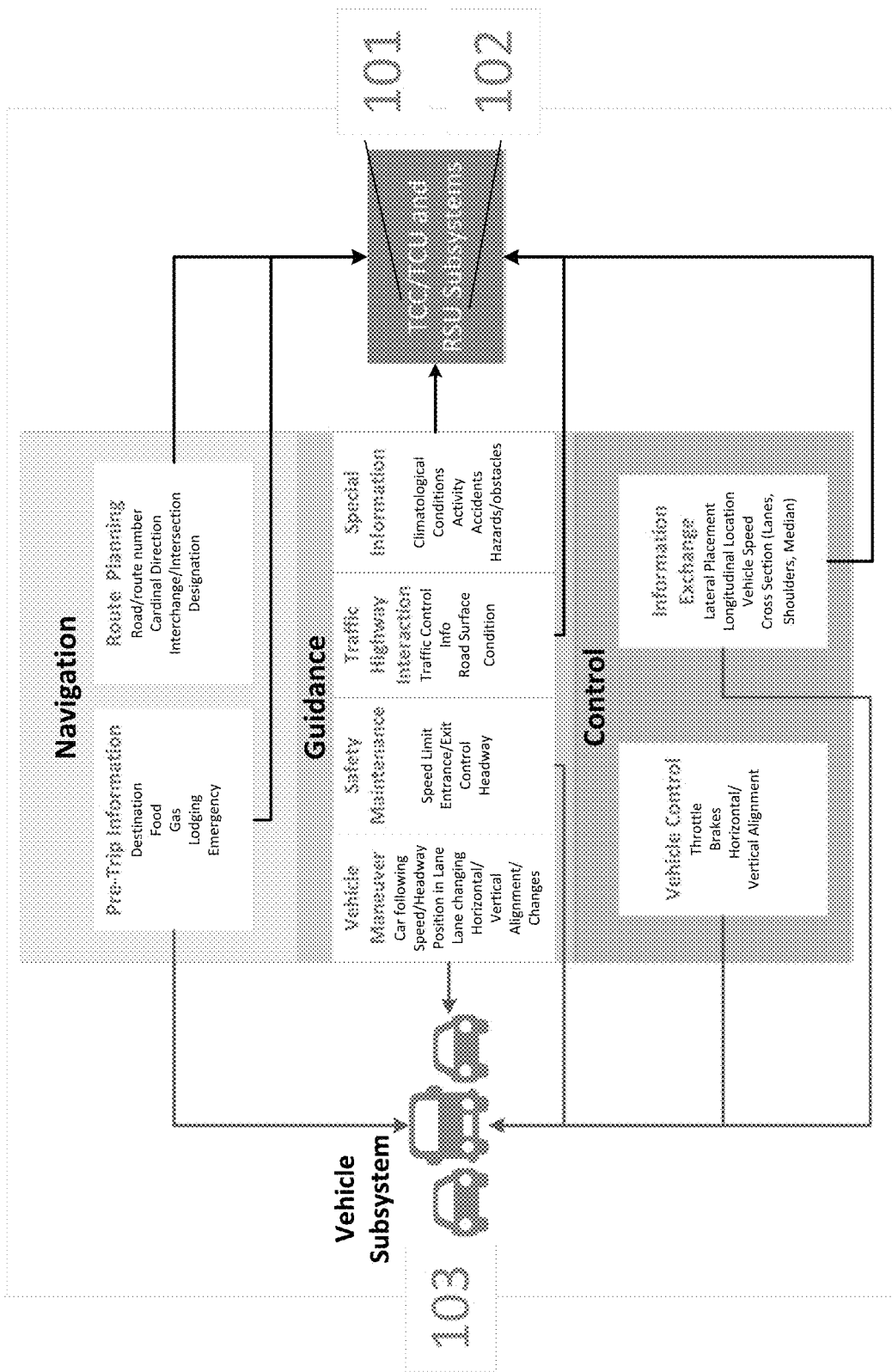

FIG. 3 shows (1) all the driving tasks among the originally defined three broad levels of performance: "Control", "Guidance", and "Navigation", according to the original definition of driving task by Lunenfeld and Alexander in 1990 (A User's Guide to Positive Guidance (3rd Edition) FHWA SA-90-017, Federal Highway Administration, Washington, D.C.). Those driving tasks are essential for all vehicles to drive safely from origins to destinations, and (2) how those tasks are distributed into and covered by the Vehicle Subsystem 103 and TCC/TCU 101+RSU 102 subsystems. In the "Navigation" level, the TCC/TCU 101+RSU 102 subsystems provide the instructions to the vehicles, including the "Pre-trip information" and "Route planning" needed for vehicles. In the "Guidance" level, the TCC/TCU 101+RSU 102 subsystems provide the instructions and information for the Guidance tasks: Traffic Control/Road Condition, and Special Information. The Vehicle subsystem 103 fulfills the Vehicle Maneuver tasks, and monitors the Safety Maintenance tasks in addition to the operation of the TCC/TCU 101+RSU 102. In the "Control" level, the TCC/TCU 101+RSU 102 subsystems provide data needs for the Information Exchange tasks. At the same time, the vehicle subsystem 103 fulfills Vehicle Control tasks, at the mechanic level, and monitors the surroundings, standing-by as the backup system.

Figure 4:
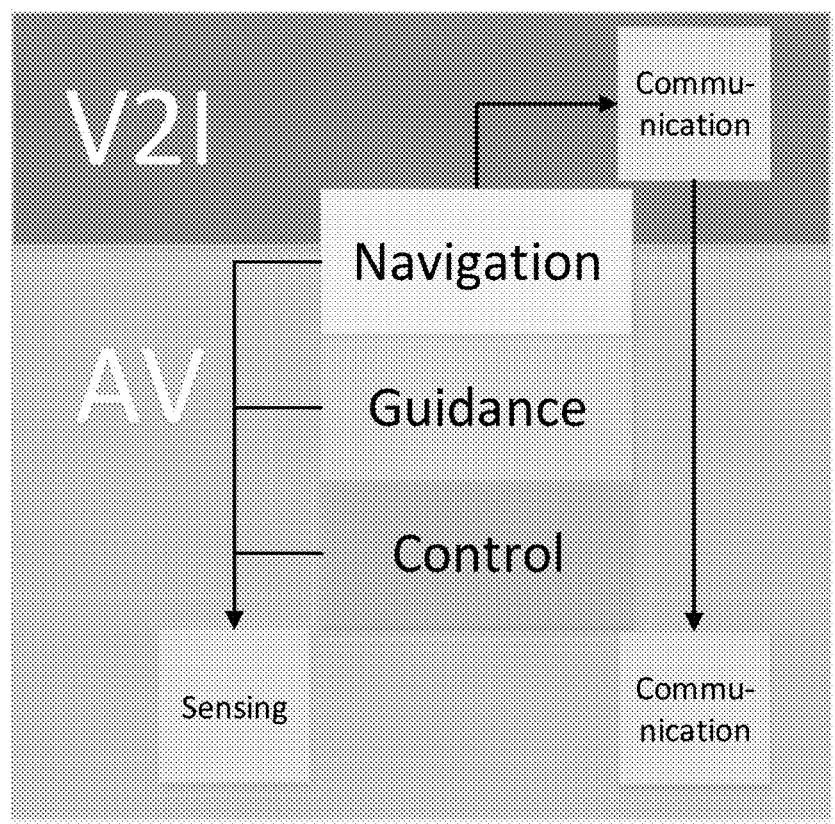

FIG. 4 shows the driving tasks distribution for the typical traditional Automated Vehicle (AV) based system solution.

The Automated Vehicle, with the support of sensing technology like radars, cameras, etc., takes over most of the driving tasks among three levels while the "Vehicle-to-infrastructure" (V2I) technology provides support mostly in the "Navigation" level. The V2I typically uses communication technology like Dedicated Short Range Communications (DSRC) to fulfill its command and information exchange intentions. However, the traditional V2I technology has limitations. One of the major issue is that it contains only a single point-of-failure, which means that whenever the server or the link to the server fails, the system will fail immediately. The failure will lead to the loss of data, and endanger the whole system.

Figure 5:
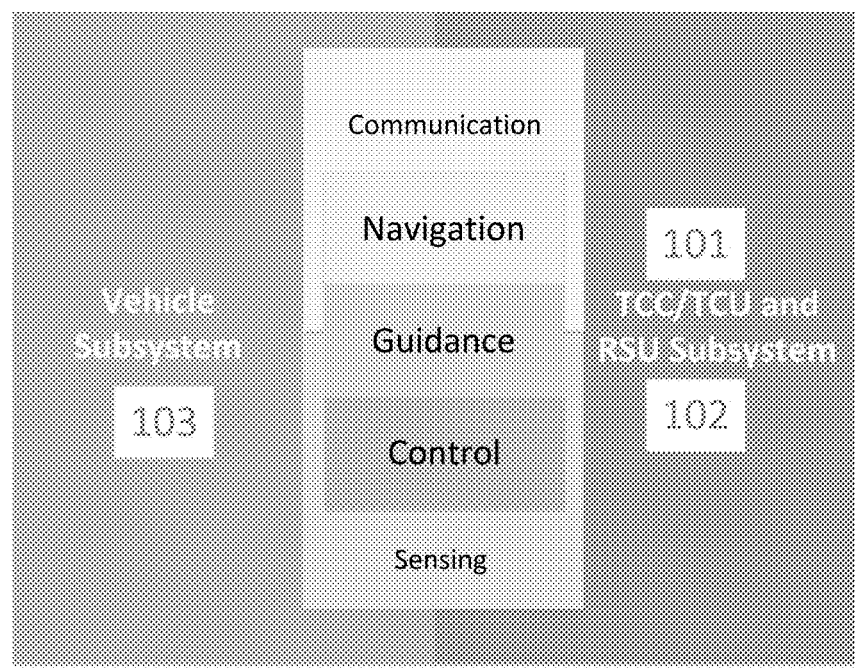
FIG. 5 illustrates an exemplary distribution of driving tasks in an embodiment of the technology provided herein.

FIG. 5 shows the driving tasks distribution of embodiments of the present system. The Vehicle Subsystem 103, together with the TCC/TCU 101 and RSU 102 Subsystem, takes over all the driving tasks among the three performance levels. The sensing and communication technology is used both by Vehicle Subsystem 103 and the TCC/TCU 101 and RSU 102 Subsystem to support the present system. The sensing serves in the level of both "Control" and "Guidance" while the communication serves in the "Navigation" and "Guidance" Levels. The collaboration of the Vehicle subsystem 103, together with the TCC/TCU 101 and RSU 102 subsystem brings the system a redundancy, which provides the system the benefits of safety, reliability and cost effectiveness. Specifically, the dual-security system provides a fail-safe mechanism. When one of the subsystems fails, the others ensure the entire system working properly.

Figure 6:
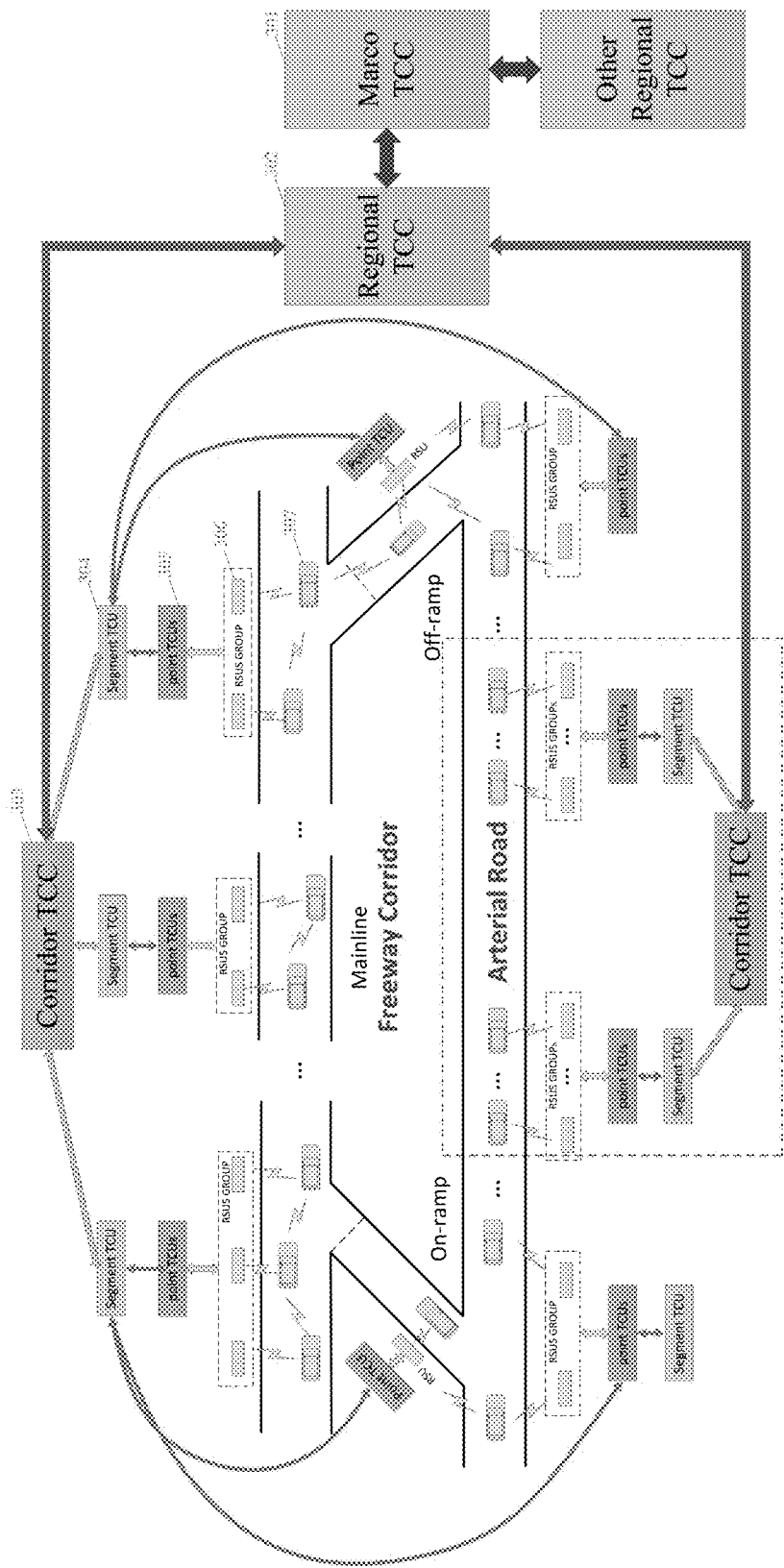
FIG. 6 illustrates exemplary system components.

As shown in FIG. 6, the Fully-Controlled Connected Automated Vehicle Highway System contains components listed as follows: The Macroscopic Traffic Control Center (Marco TCC) 301, which is automatic or semi-automated computational center covering several regions and inter-regional traffic control that focus on data gathering, information processing, and large-scale network traffic optimization. The Regional Traffic Control Center (Regional TCC) 302, which is automatic or semi-automated computational center covering a city or urban area traffic control that focus on data gathering, information processing, urban network traffic control optimization. The Corridor Traffic Control Center (Corridor TCC) 303, which is automatic or semi-automated computational center covering a corridor with connecting roads and ramps traffic control that focus on corridor data gathering, processing, traffic entering and exiting control, and dynamic traffic guidance on freeway. The Segment Traffic Control Unit (Segment TCU) 304, which is a local automatic or semi-automated control unit covering a short road segment traffic control that focus on segment data gathering, processing and local traffic control. Point Traffic Control Unit (Point TCU) 305, which is an automatic control unit covering a small freeway area, ramp metering, or intersections that focus on data gathering, traffic signals control, and vehicle requests processing. The Marco TCC 301, Regional TCC 302, Corridor TCC 303, Segment TCU 304 and Point TCU 305 are the components of TCC/TCU subsystem 101. The Road Side Units (RSU 306), which represents small control units that receive data and requests from connected vehicles, detect traffic state, and send instructions to targeted vehicles. The network comprising RSUs 306 is the RSU subsystem 303, which focuses on data sensing, data processing, and control signal delivery. The connected and automated vehicles 307 is the basic element of vehicle subsystem 304, including vehicles at different levels of connectivity and automation. OBU (On-Board Unit with sensor and V2I communication units) network is embedded in connected and automated vehicles 307.

Figure 7:
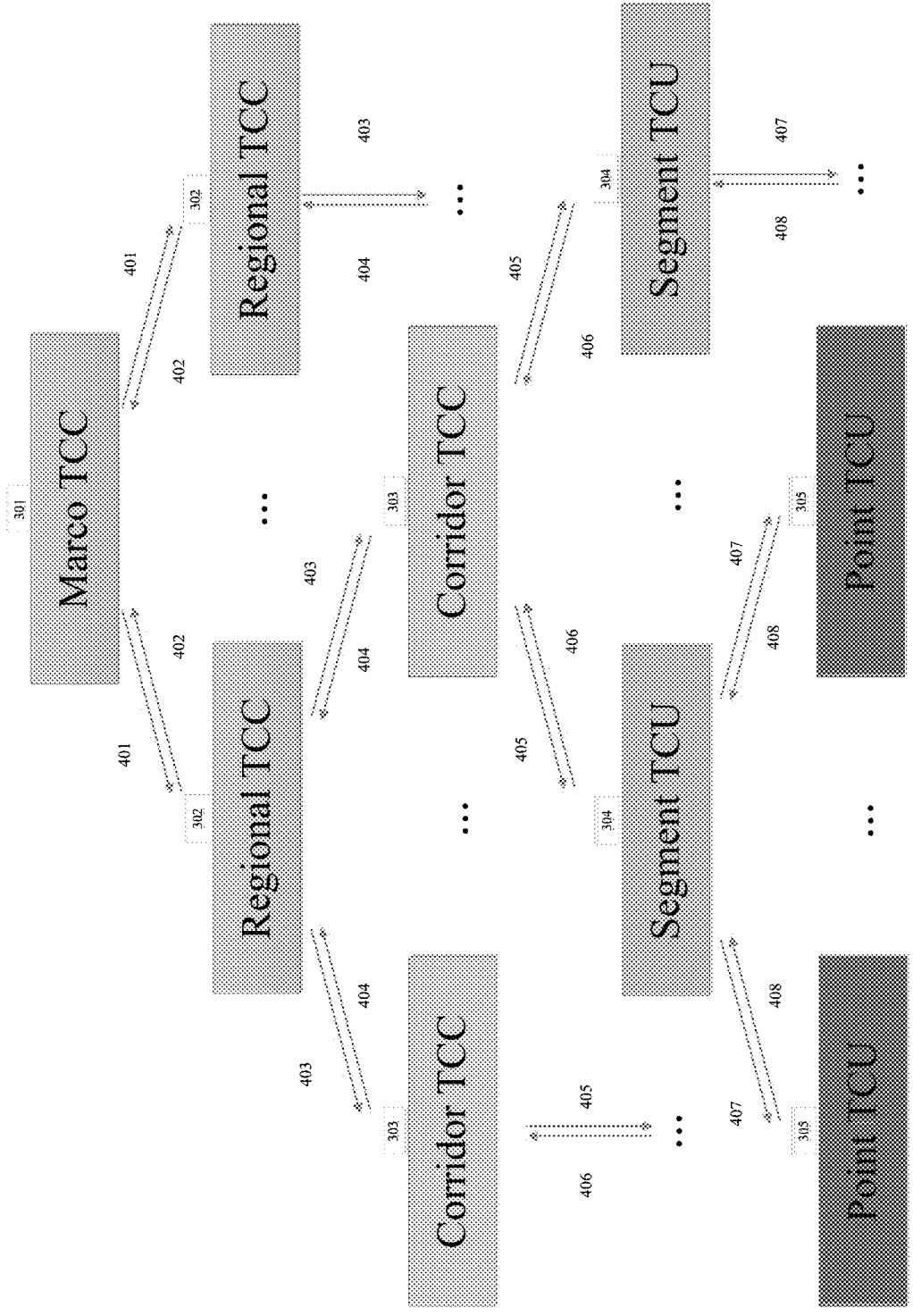
FIG. 7 illustrates an exemplary TCU (Traffic Control Unit) subsystem.

As shown in FIG. 7, the top level macroscopic traffic control center (TCC) 301 sends control target such as regional traffic control and boundary information 401 to second level regional TCC 302. At the same time, regional TCC 302 sends refined traffic conditions 402 such as congestion condition back to macro TCC 301, which helps macro TCC 301 to deal with large-scale network traffic optimization. Similar processes are carried out between every two consecutive levels. Regional TCC 302 sends control target and boundary information 403 to corridor TCC 303 and receives refined traffic condition 404. Corridor TCC 303 sends control target and boundary information 405 to segment traffic control unit (TCU) 304 and receives refined traffic condition 406. Segment TCU 304 sends control target and boundary information 407 to point TCUs 305 and receives point TCUs' 305 refined traffic conditions 408.

Figure 8:
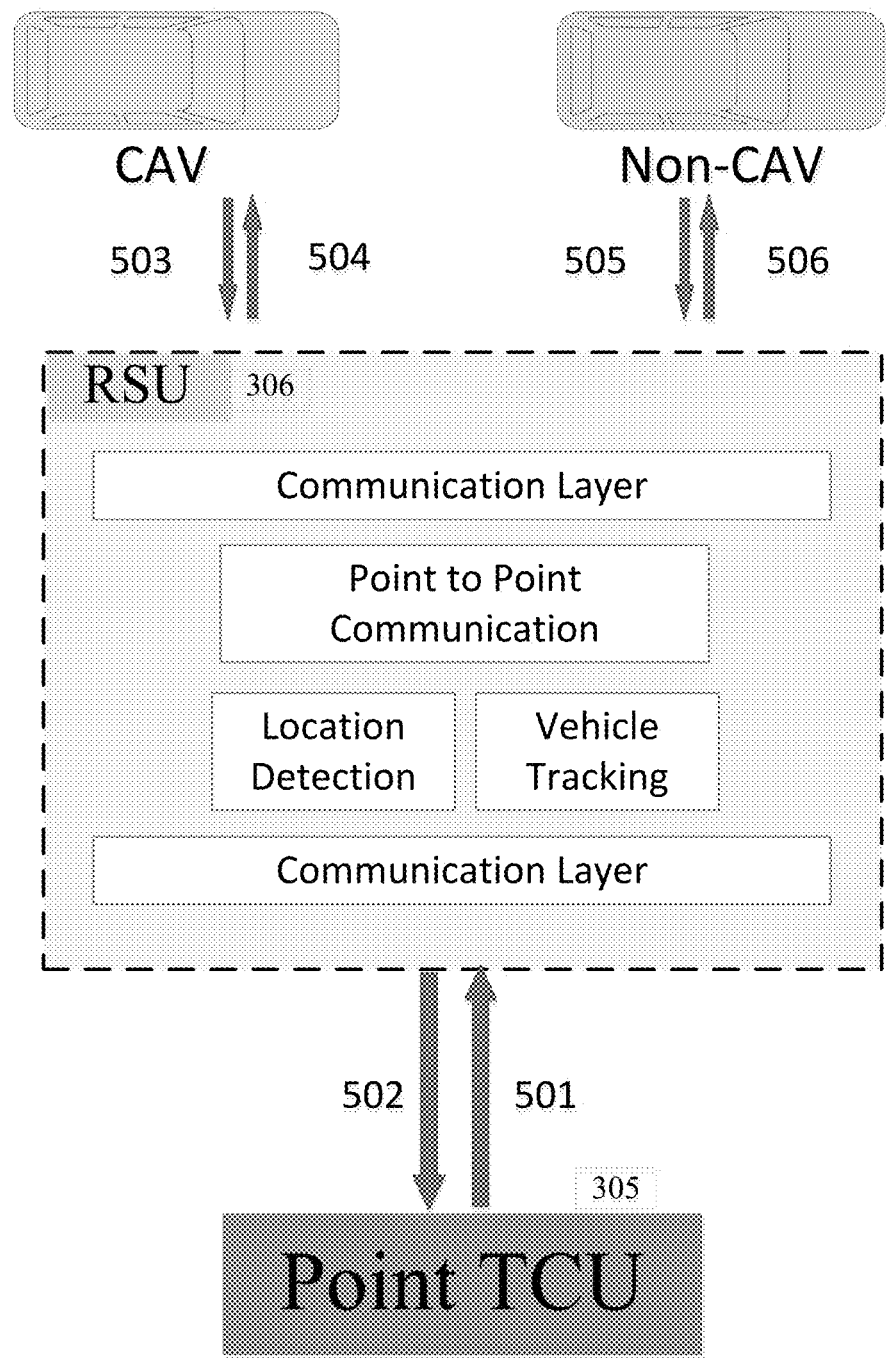
FIG. 8 illustrates an exemplary RSU (Road Side Unit) subsystem.

As shown in FIG. 8, Road side unit group 306 receives data from CAV and Non-CAV and detects traffic conditions. Then, Road side unit group 306 sends data to point traffic control unit 305. After receiving all data from the Road side unit group 306 that is located in the covering area, point traffic control unit 305 optimizes traffic control strategy for all area and sends targeted instructions to Road side unit group 306.

Figure 9:
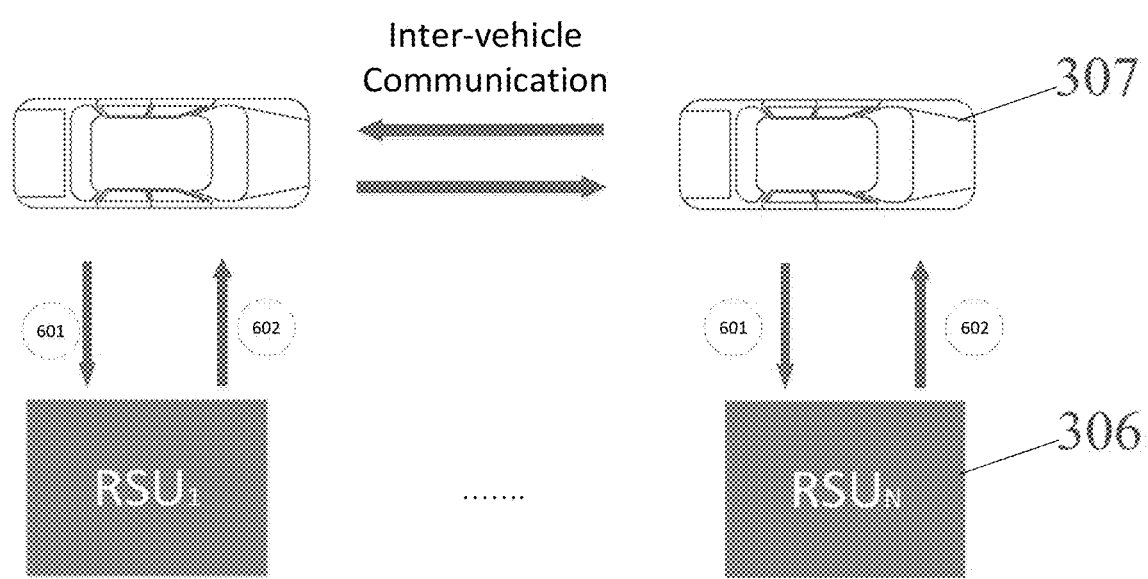
FIG. 9 illustrates exemplary vehicle subsystem data flow.

As shown in FIG. 9, road side unit group 306 receives data from connected vehicles 307, detects traffic conditions, and sends targeted instructions to vehicles 307. The RSU network focuses on data sensing, data processing, and control signal delivering. Information is also shared by different vehicles 307 that have communication with each other. Vehicles 307 also is a subsystem that can comprise a mixed traffic flow of vehicles at different levels of connectivity and automation.

Figure 10:
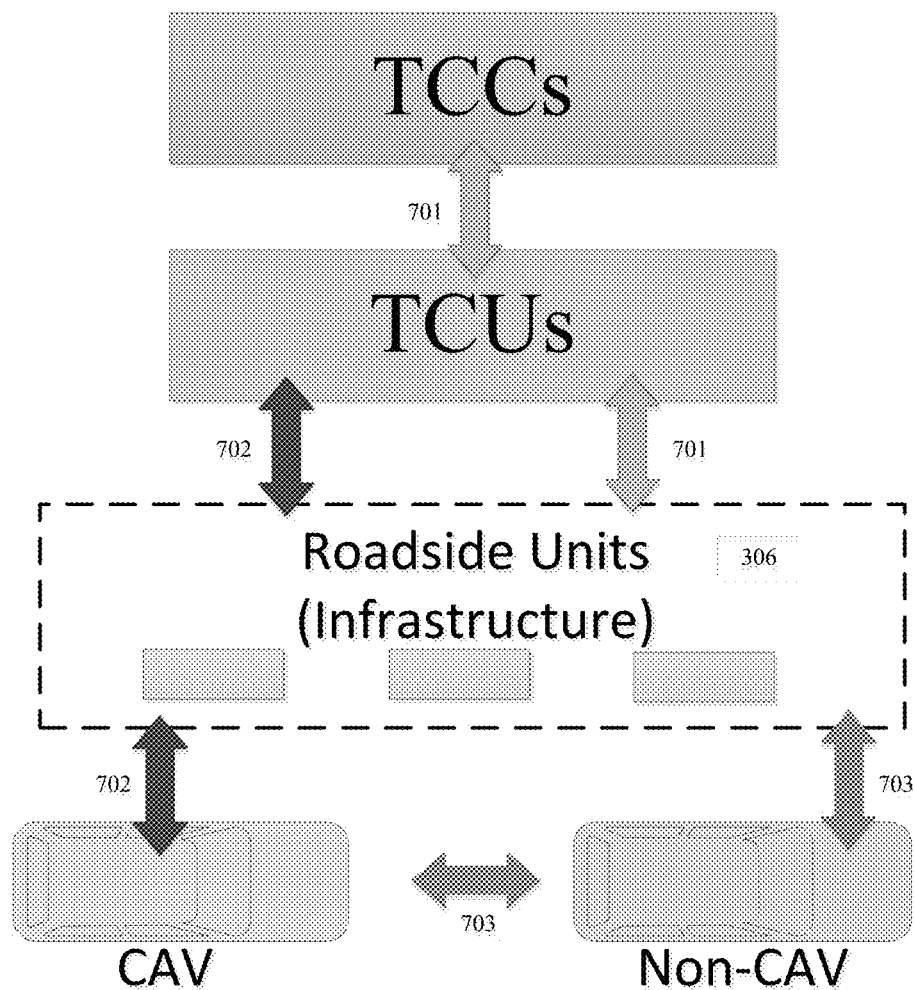
FIG. 10 illustrates an exemplary communication subsystem.

As shown in FIG. 10, Department of Transportation 701 controls the communication information between traffic control centers (TCC) and traffic control units (TCU). The information between TCUs and roadside units (RSU) is shared with Department of Transportation 701 and communication service provider 702. The communication service provider 702 also controls data between roadside units and connected automated vehicle (CAV). The communication between non-CAV and CAV, and between RSU and non-CAV, is controlled by OEM 703.

Figure 11:
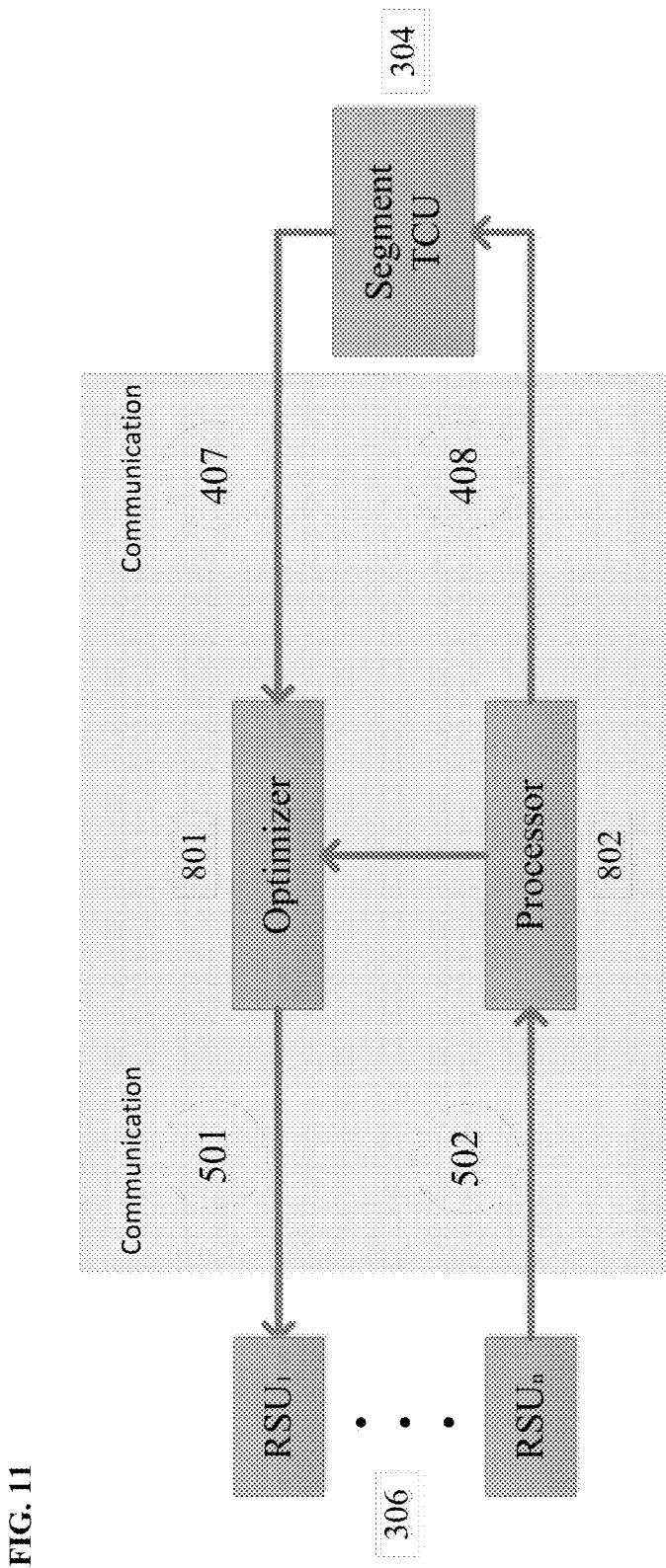
FIG. 11 illustrates an exemplary point TCU.

As shown in FIG. 11, RSU 306 collects traffic data from highway and passes the traffic information 502 to optimizer 801 and processor 802. After receiving data, processor 802 processes it and generates current traffic conditions 408, which is delivered to Segment TCC 304. Segment TCC 304 decides the control target 407 to be controlled and informs optimizer 801 about it. Optimizer 801 optimizes the plan based on traffic information 502 and control target 407 and returns the vehicle-based control instructions 501 to RSU 306.

Figure 12:
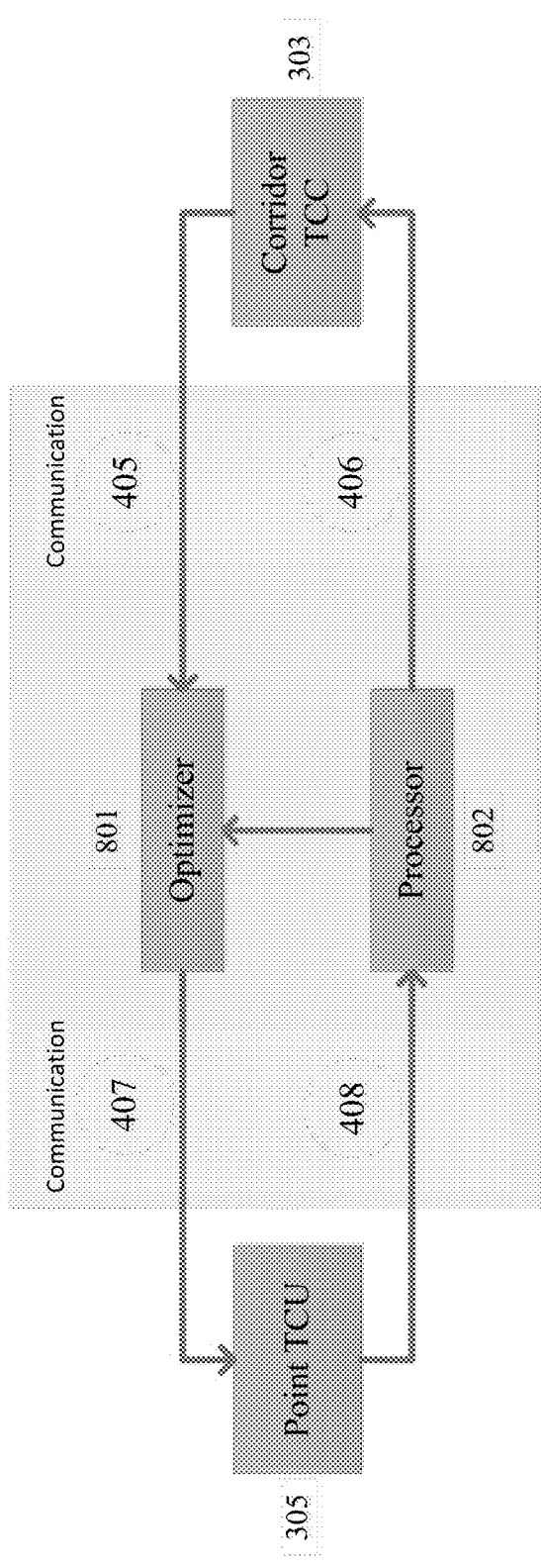
FIG. 12 illustrates an exemplary segment TCU.

As shown in FIG. 12, Point TCU 305 generates current traffic conditions 408 and passes them to optimizer 801 and processor 802. After receiving the condition information, processor 802 processes it and generates current segment traffic conditions 406, which is delivered to Corridor TCC 303. Corridor TCC 303 decides the control target 405 to be controlled and informs optimizer 801 about it. Optimizer 801 optimizes the plan based on traffic conditions 408 and control target 405 and returns control target 407 for Point TCU 305.

Figure 13:
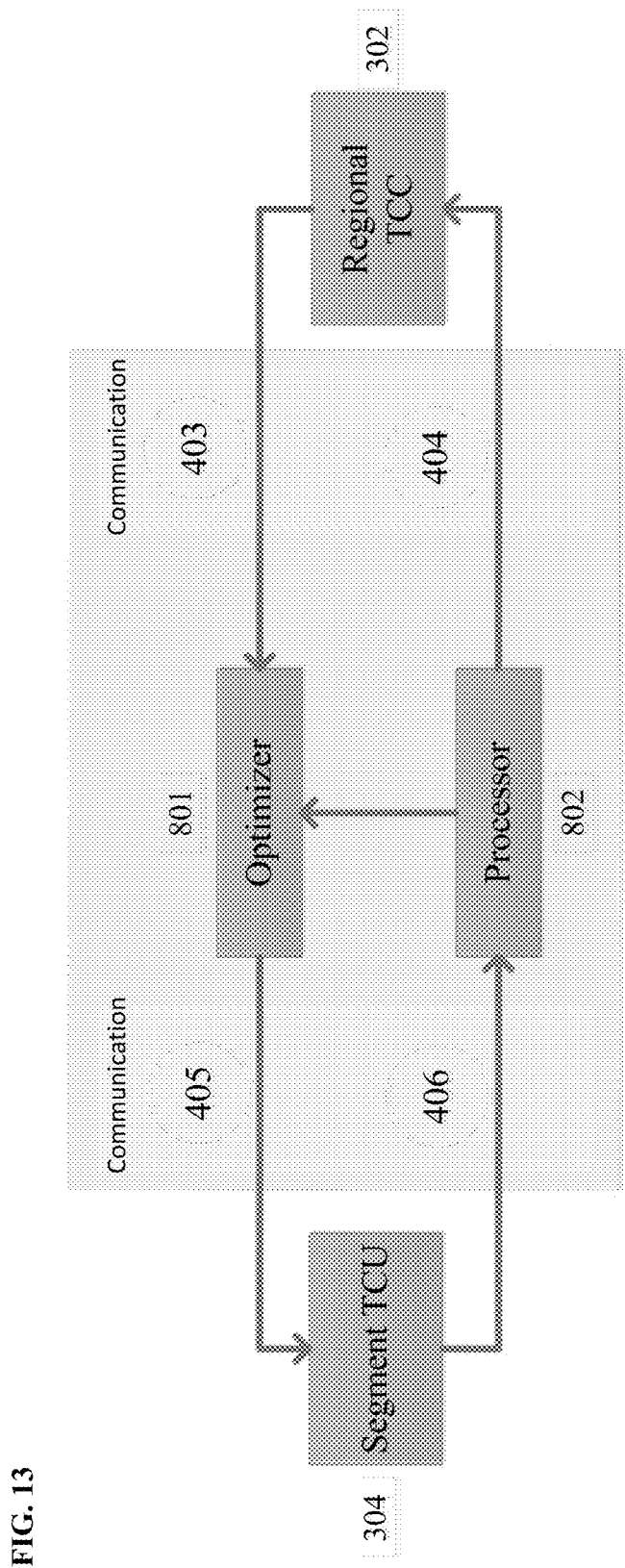
FIG. 13 illustrates an exemplary corridor TCU.

As shown in FIG. 13, Segment TCU 304 generates current segment traffic conditions 406 and passes them to optimizer 801 and processor 802. After receiving the condition information, processor 802 processes it and generates current corridor traffic conditions 404, which is delivered to Regional TCC 302. Regional TCC 302 decides the control target 403 to be controlled and informs optimizer 801 about it. Optimizer 801 optimizes the plan based on segment traffic conditions 406 and control target 403 and returns control target 405 for Segment TCU 304.

Figure 14:
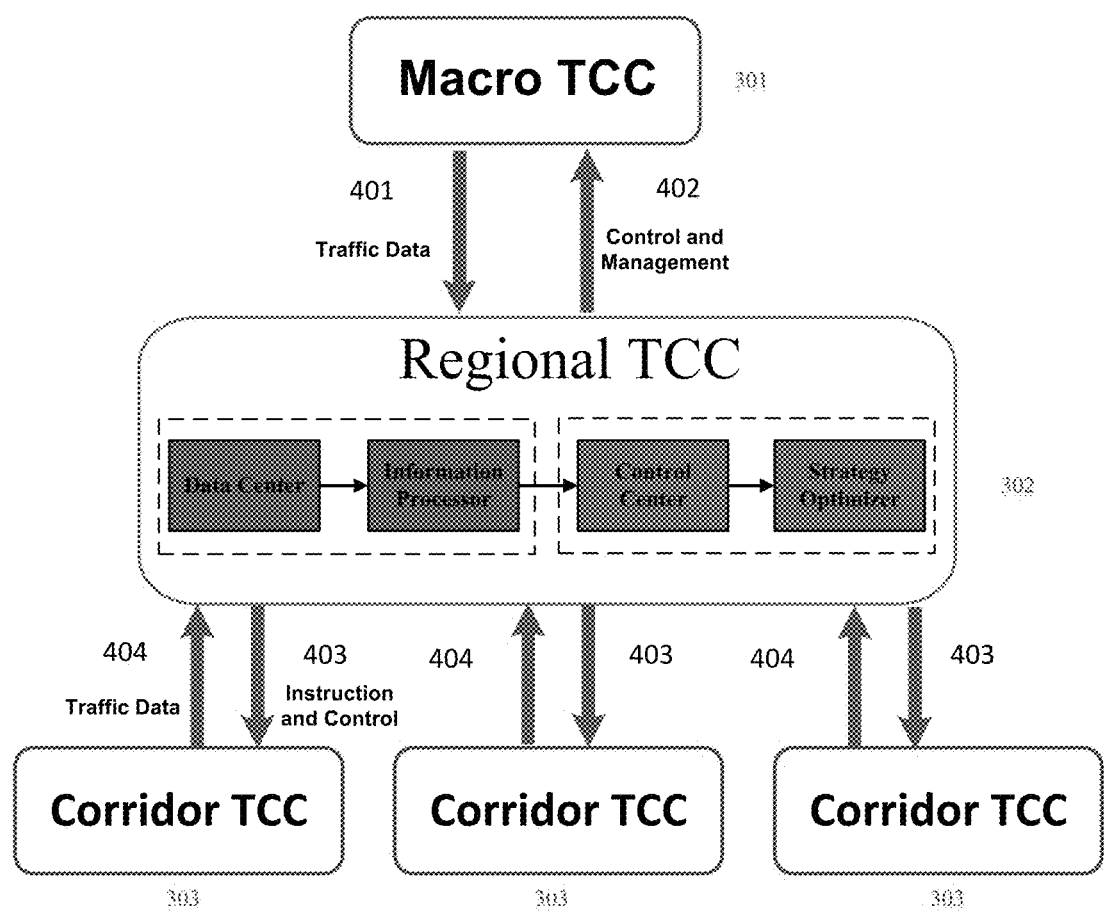
FIG. 14 illustrates an exemplary regional TCU.

FIG. 14 shows the data and decision flow of Regional TCC 302. Each Corridor TCC 303 collectively sends all the traffic data to the Regional TCC 302. After the data is received by the data center, all the data is processed by the information processor. The information processor integrates traffic data and sends it to the control center. The control center makes draft-decision by a preset algorithm and sends the result to strategy optimizer. The optimizer simulates the decision and optimizes it and sends it to both Corridor TCC 303 and Macro TCC 301. Macro TCC 301 shares traffic data from other Regional TCCs 302 nearby and system optimized decision back to the Regional TCC 302.

Figure 15:
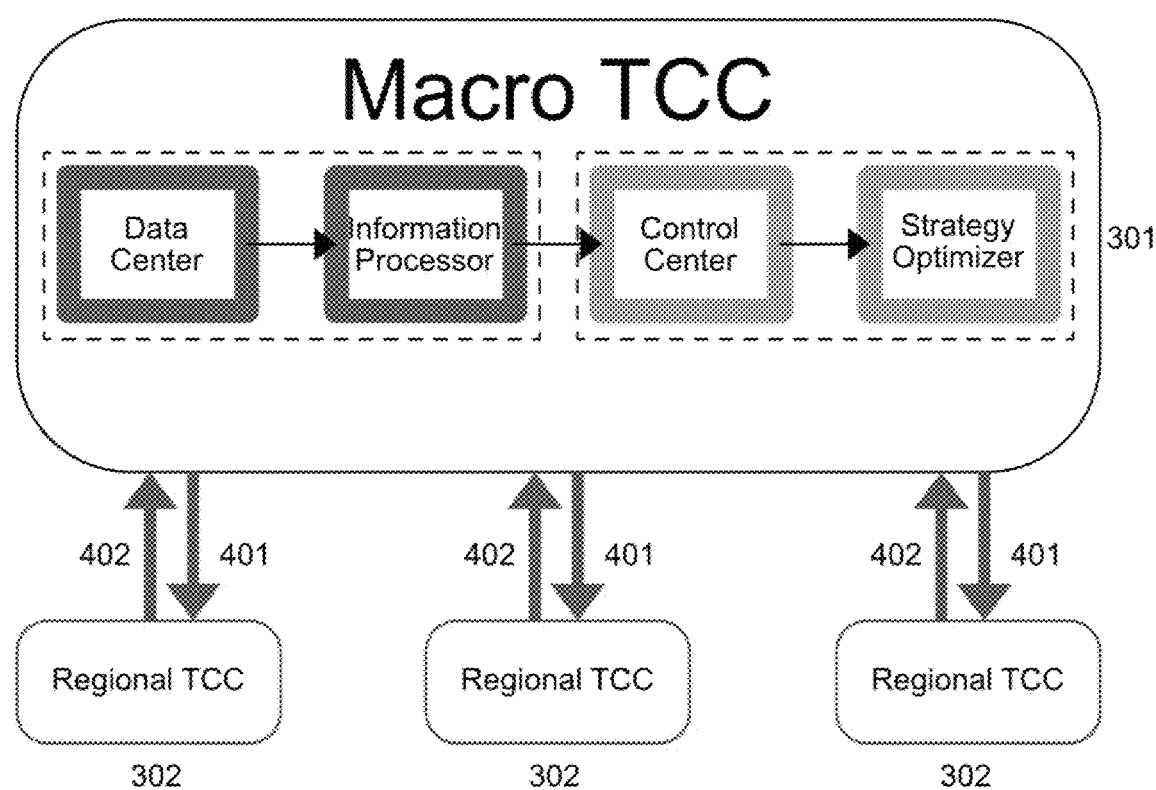
FIG. 15 illustrates an exemplary macroscopic TCC (Traffic Control Center)

As shown in FIG. 15, each Regional TCC 302 sends the traffic data and local optimized strategy to the Macro TCC 301. An information processor integrates all optimized strategies and traffic data. After that, the control center makes a draft-decision based on the traffic data from Regional TCCs 303. The draft-decision is then processed by the strategy optimizer. A final system-optimized decision is made and sent back to the Regional TCCs 303.

Figure 16:
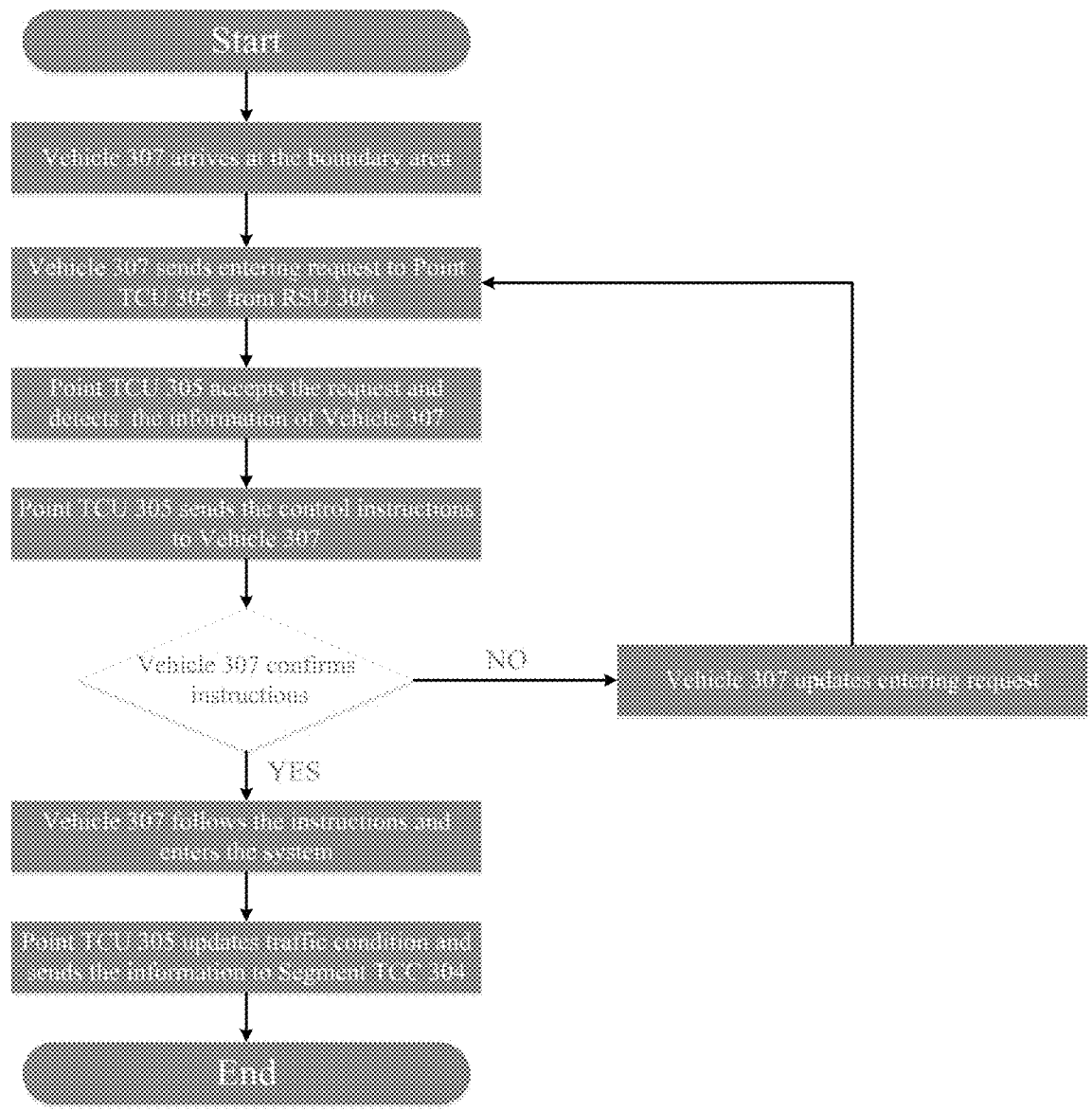
FIG. 16 illustrates an exemplary vehicle entering control.

FIG. 16 illustrates the process of vehicles 307 entering the fully-controlled system. As shown in FIG. 16, vehicles 307 send the entering requests to RSUs 306 after arriving at the boundary area of the system. The boundary area refers to the area around the margin of a Segment TCU's 304 control range. RSUs 306 provide the entering requests to Point TCUs 305 and detect the information of vehicles 307, including static and dynamic vehicle information 6.2, after Point TCUs 305 accept the entering requests. Point TCUs 305 formulate the control instructions 6.1 (such as advised speed, entering time, entering position, etc.) for vehicles 307 to enter the fully-controlled system and attempt to take over the control of vehicles 307, based on the information detected by RSUs 306. Vehicles 307 receive the control instructions 6.1 from RSUs 306 and process the instructions 6.1 with the inner subsystems to decide whether the instructions 6.1 can be confirmed. Vehicles 307 update and send the entering requests again if the control instructions 6.1 cannot be confirmed based on the judgment of the inner subsystems. Vehicles 307 drive following the control instructions 6.1 and enter the fully-control system if the control instructions 6.1 are confirmed. Point TCUs 305 take over the driving control of vehicles 307, and vehicles 307 keep driving based on the control instructions 6.1 provided from the fully-controlled system. Point TCUs 305 update the traffic condition and send the refined information 4.8 to the Segment TCU 304 after vehicles 307 enter the fully-controlled system.

Figure 17:
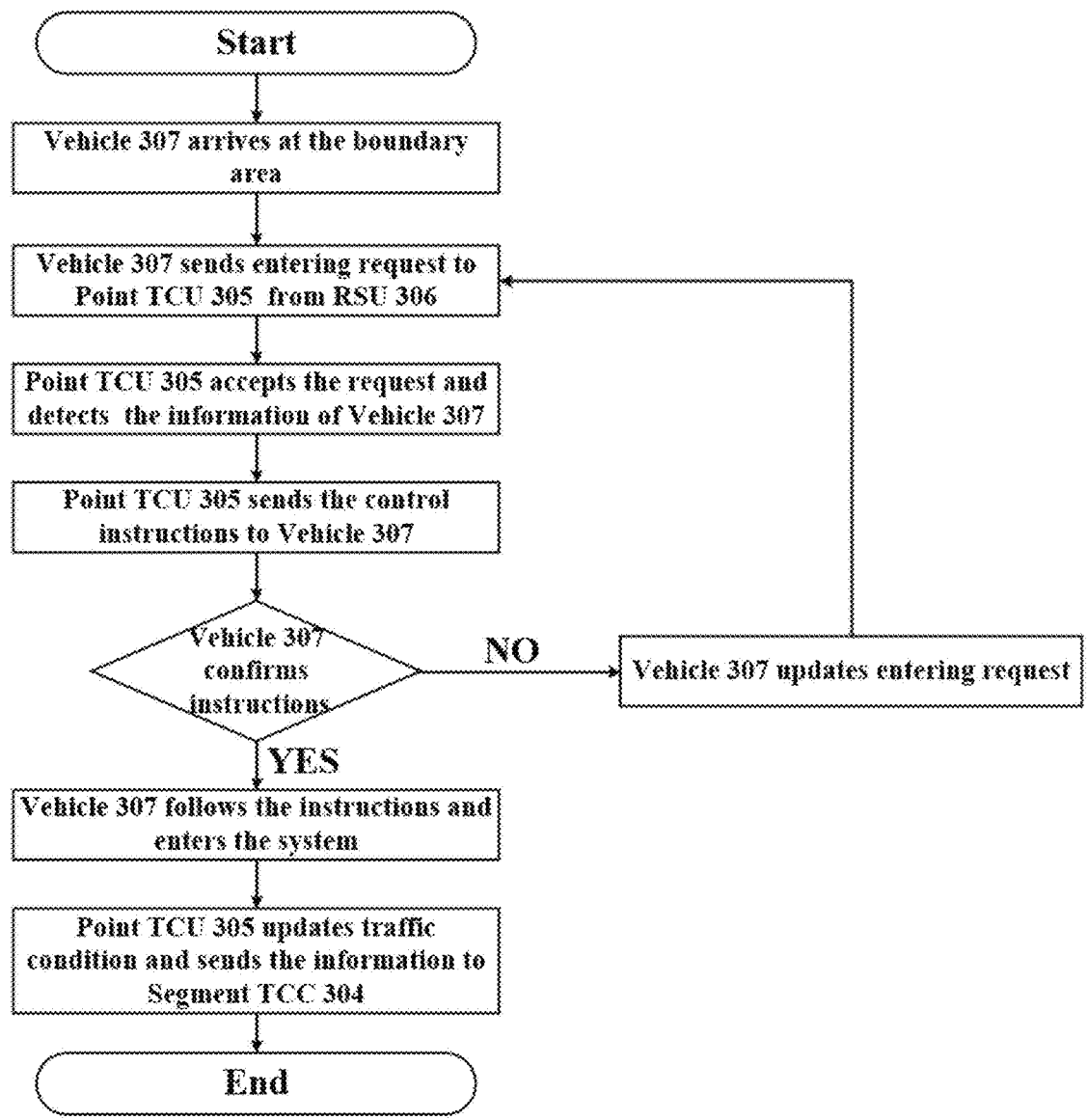
FIG. 17 illustrates an exemplary vehicle exit control.

FIG. 17 illustrates the process of vehicles 307 exiting the fully-controlled system. As shown in FIG. 17, vehicles 307 send the exiting requests to RSUs 306 after arriving at the boundary area of the system. The boundary area refers to the area around the margin of a Segment TCU's 304 control range. RSUs 306 provide the exiting requests to Point TCUs 305. Point TCUs 305 formulate the exiting instructions 6.1 (such as advised speed, exiting time, exiting position, etc.) for vehicles 307 to exit the fully-controlled system based on the information detected by RSUs 306. Vehicles 307 receive the exiting instructions 6.1 from RSUs 306 and process the instructions 6.1 with the inner subsystems to decide whether the instructions 6.1 can be confirmed. Vehicles 307 update and send the entering requests again if the exiting instructions 6.1 can't be confirmed based on the judgment of the inner subsystems. Vehicles 307 drive following the exiting instructions 6.1 and exit the fully-control system if the exiting instructions 6.1 are confirmed. Point TCUs 305 terminate the driving control of vehicles 307, and vehicles 307 start the autonomous driving and follow their own drive strategies after conducting the exiting constructions. Point TCUs 305 update the traffic condition and send the refined information 4.8 to the Segment TCU 304 after vehicles 307 exit the fully-controlled system.

EXAMPLE

The following example provides one implementation of an embodiment of the systems and methods of the technology herein, designed for a freeway corridor.

1. RSU

RSU Module Design

Figure 18:
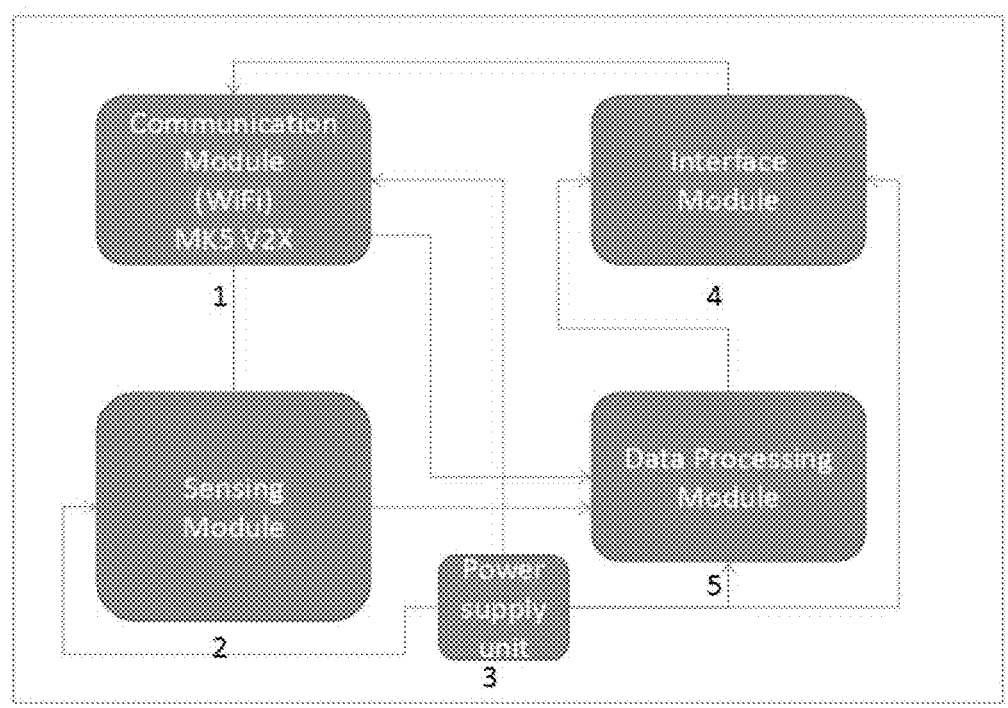
FIG. 18 illustrates an exemplary RSU Module Design.

As shown in FIG. 18, a RSU has two primary functions: 1) communication with vehicles and point traffic control units (TCUs), and 2) collecting traffic and vehicle driving environmental information. The sensing module (2) gathers information using various detectors described in detail in the following sections. The data processing module (5) uses data fusion technology to obtain six major feature parameters, namely speed, headway, acceleration/deceleration rates, the distance between carriageway markings and vehicles, angle of vehicles and central lines, and overall traffic status. Meanwhile, the communication module (1) also sends information received from vehicles and point TCUs to the data processing module (5) to update the result of the module. After six feature parameters are generated, the communication module (1) sends driving instructions to the OBU system installed on an individual vehicle, and shares the information with point TCUs. The interface module (4) will show the data that is sent to the OBU system. The power supply unit (3) keeps the power to maintain the whole system working.

Communication Module

Communication with Vehicles

Hardware Technical Specifications:
 Standard Conformance: IEEE 802.11p—2010
 Bandwidth: 10 MHz
 Data Rates: 10 Mbps
 Antenna Diversity CDD Transmit Diversity
 Environmental Operating Ranges: −40° C. to +55° C.
 Frequency Band: 5 GHz
 Doppler Spread: 800 km/h
 Delay Spread: 1500 ns
 Power Supply: 12/24V Exemplary on-market components that may be employed are:

A. MK5 V2X from Cohda Wireless (http://cohdawireless.com)

B. StreetWAVE from Savari (http://savari.net/technology/road-side-unit/)

Communication with Point TCUs

Hardware Technical Specifications:
 Standard Conformance: ANSI/TIA/EIA-492AAAA and 492AAAB
 Optical fiber
 Environmental Operating Ranges: −40° C. to +55° C.

Figure 19:
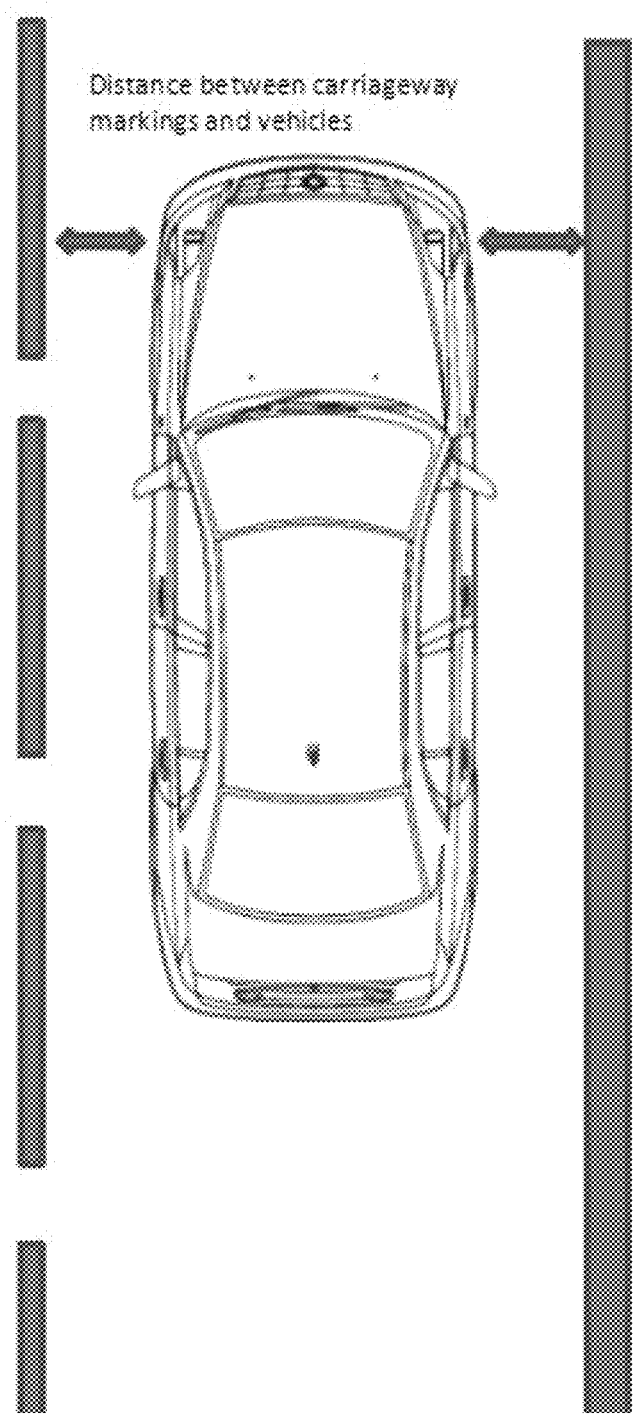
FIG. 19 illustrates distance between carriageway markings and vehicles.
Figure 20:
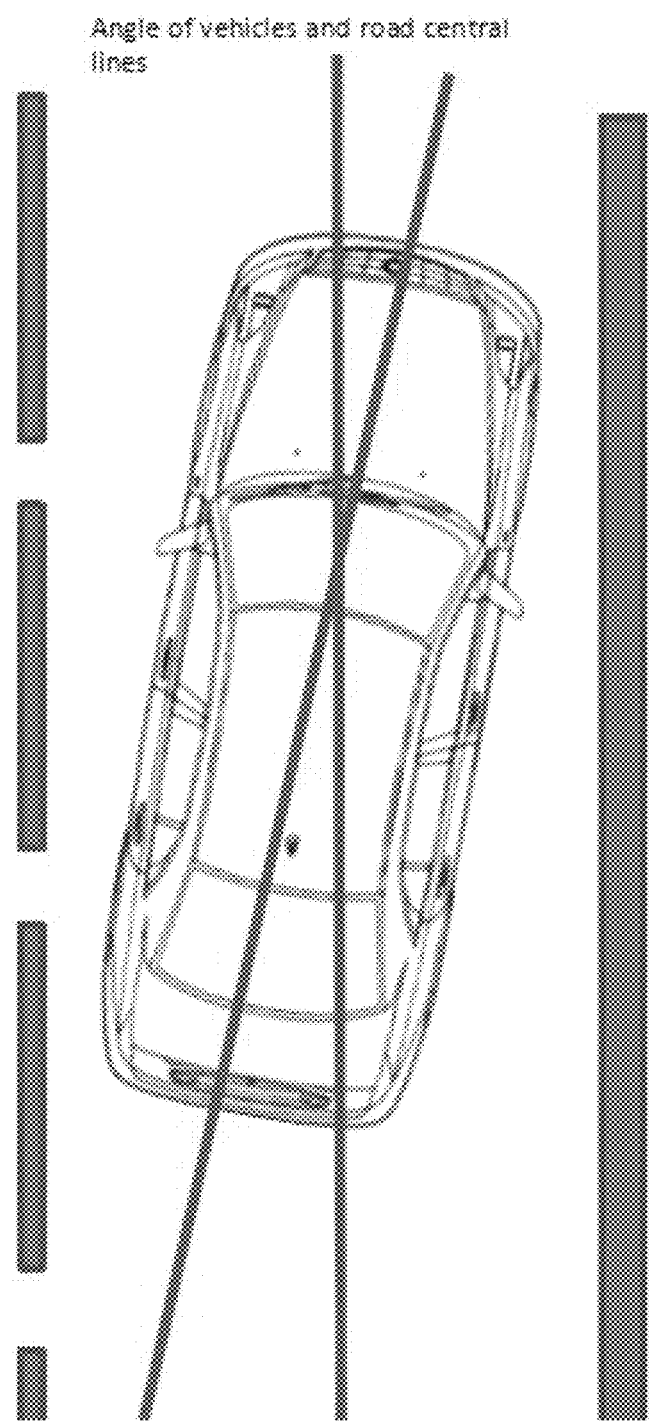
FIG. 20 illustrates angle of vehicles and road central lines.
Figure 21:
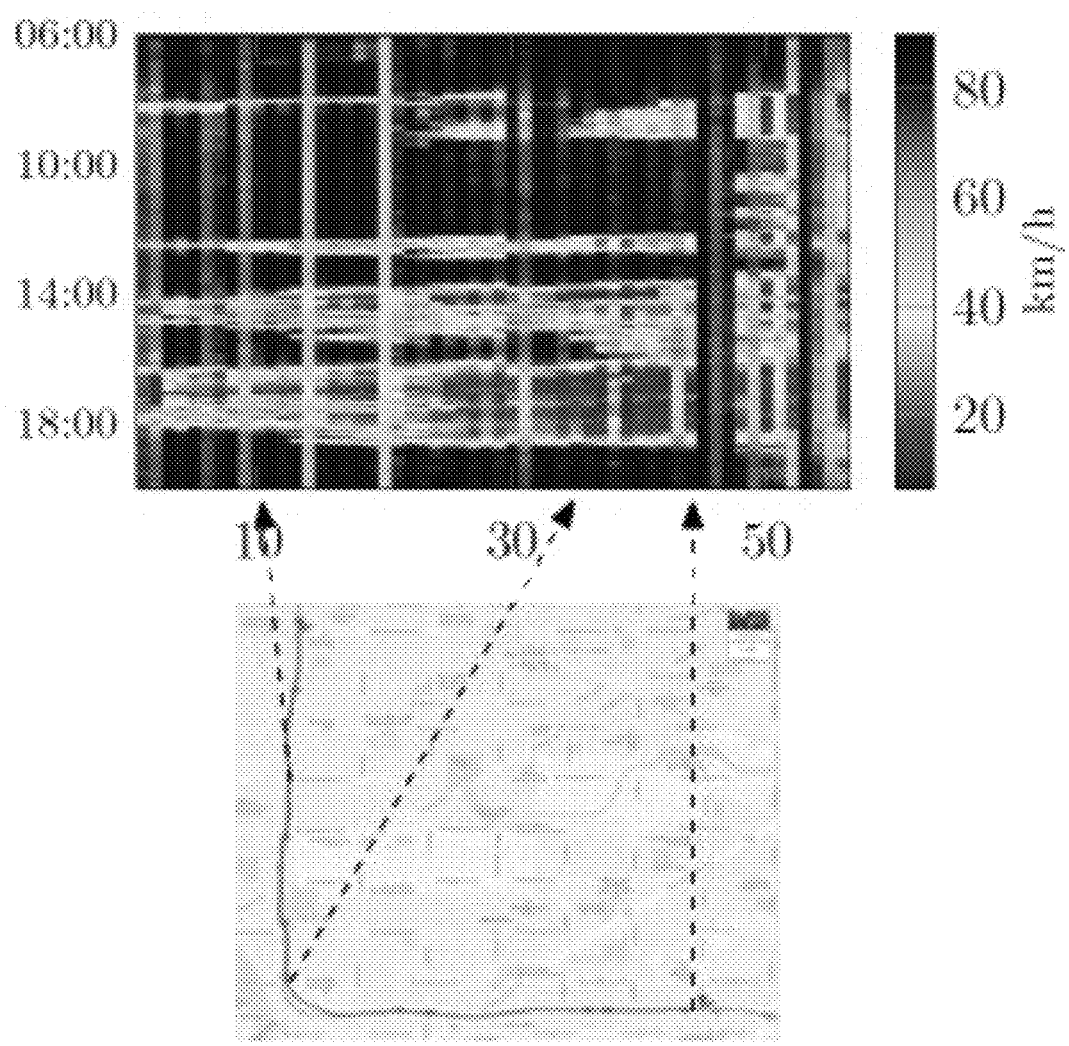
FIG. 21 illustrates an exemplary overall traffic state.

Exemplary on-market components that may be employed are: Optical Fiber from Cablesys
https://www.cablesys.com/fiber-patch-cables/?gclid=Cj0K-EQjwldzHBRCfg_aImKrf7N4BEiQABJTPKH_q2wbjNL-GBhBVQVSBogLQMkDaQdMm5rZtyBaE8uuUaAhTJ8-P8HAQ Sensing Module Six feature parameters are detected.
  Speed
    Description: Speed of individual vehicle
    Frequency: 5 Hz
    Error: less than 5 mile/h with 99% confidence
  Headway
    Description: Difference in position between the front of a vehicle and the front of the next vehicle
    Frequency: 5 Hz
    Error: less than 1 cm with 99% confidence
  Acceleration/Deceleration
    Description: Acceleration/Deceleration of individual vehicle
    Frequency: 5 Hz
    Error: less than 5 ft/s$^2$ with 99% confidence
  Distance between carriageway markings and vehicles
  See, FIG. 19
    Frequency: 5 Hz
    Error: Less than 5 cm with 99% confidence
  Angle of vehicles and road central lines
  See, FIG. 20
    Frequency: 5 Hz
    Error: less than 5° with 99% confidence
  Overall traffic state
  See, FIG. 21
    Frequency: 5 Hz
    Error: less than 5% error with space resolution of 20 meters SESING_MODULE_TYPE_A (LIDAR+Camera+Microwave Radar):
  a. LIDAR
Hardware Technical Specifications
  Effective detection distance greater than 50 m
  Scan rapidly over a field of view of 360°
  Detection error is 99% confidence within 5 cm
Exemplary on-market components that may be employed are:
A. R-Fans_16 from Beijing Surestar Technology Co. Ltd
http://www.isurestar.com/index.php/en-product-product.html#9
B. TDC-GPX2 LIDAR of precision-measurement-technologies
http://pmt-fl.com/C.
HDL-64E of Velodyne Lidar
http://velodynelidar.com/index.html
Software technical Specifications
  Get headway between two vehicles
  Get distance between carriageway markings and vehicles
  Get the angel of vehicles and central lines.
Exemplary on-market components that may be employed are: LIDAR in ArcGIS
  b. Camera
Hardware technical Specifications
  170 degree high-resolution ultra-wide-angle
  Night Vision Capable
Software Technical Specifications
  The error of vehicle detection is 99% confidence above 90%
  Lane detection accuracy is 99% confidence above 90%
  Drivable path extraction
  Get acceleration of passing vehicles Exemplary on-market components that may be employed are: EyEQ4 from Mobileye
http://www.mobileye.com/our-technology/The Mobileye system has some basic functions: vehicle and pedestrian detection, traffic sign recognition, and lane markings identification (see e.g., barrier and guardrail detection, US20120105639A1, image processing system, EP2395472A1, and road vertical contour detection, US20130141580A1, each of which is herein incorporated reference in its entirety. See also US20170075195A1 and US20160325753A1, herein incorporated by reference in their entireties.

The sensing algorithms of Mobileye use a technique called Supervised Learning, while their Driving Policy algorithms use Reinforcement Learning, which is a process of using rewards and punishments to help the machine learn how to negotiate the road with other drivers (e.g., Deep learning).

c. Microwave Radar
Hardware Technical Specifications
  Reliable detection accuracy with isolation belt
  Automatic lane segmentation on the multi-lane road
  Detection errors on vehicle speed, traffic flow and occupancy are less than 5%
  Ability to work under temperature lower than −10° C.
Exemplary on-market components that may be employed are: STJ1-3 from Sensortech
http://www.whsensortech.com/Software
technical Specifications
  Get speed of passing vehicles
  Get volume of passing vehicles
  Get acceleration of passing vehicles In some embodiments, data fusion technology is used such as the product from DF Tech to obtain six feature parameters more accurately and efficiently, and to use a backup plan in case one type of detectors has functional problems.

SESING_MODULE_TYPE_B (Vehicle ID Recognition Device):
Hardware Technical Specifications
  Recognize a vehicle based on OBU or vehicle id.
  Allowable speed of vehicle movement is up to 150 km/h
  Accuracy in daylight and at nighttime with artificial illumination is greater than 90% with 99% confidence
  Distance from system to vehicle is more than 50 m
Exemplary on-market components that may be employed are:
A. Products for Toll Collection—Mobility—SiemensProducts for Toll Collection—Mobility—Siemens
https://www.mobility.siemens.com/mobility/global/en/urban-mobility/road-solutions/toll-systems-for-cities/products-for-toll-collection/pages/products-for-toll-collection.aspx
B. Conduent™—Toll Collection SolutionsConduent™—Toll Collection Solutions https://www.conduent.com/solution/transportation-solutions/electronic-toll-collection/
Software Technical Specifications
  Recognize the vehicle and send the information to the database to link the six feature parameter to each vehicle.
Exemplary on-market components that may be employed are: Siemens.

Data Processing Module

The function of data processing module is to fuse data collected from multiple sensors to achieve the following goals.

Accurate positioning and orientation estimation of vehicles

High resolution-level traffic state estimation

Autonomous path planning

Real time incident detection

Exemplary on-market components that may be employed are: External Object Calculating Module (EOCM) in Active safety systems of vehicle (Buick LaCrosse). The EOCM system integrates data from different sources, including a megapixel front camera, all-new long-distance radars and sensors to ensure a faster and more precise decision-making process. (See e.g., U.S. Pat. No. 8,527,139 B1, herein incorporated by reference in its entirety).

Figure 22:
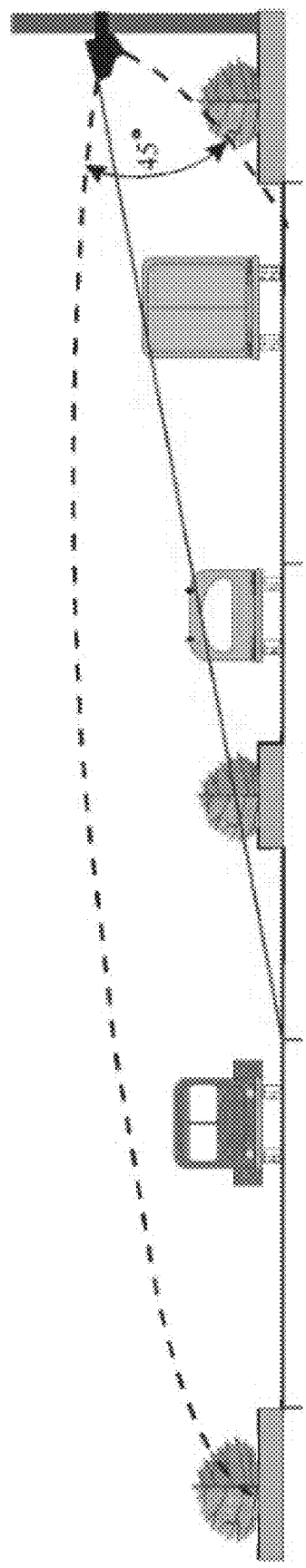
FIG. 22 illustrates installation angle of microwave radar.

Installation:

In some embodiments, one RSU is installed every 50m along the connected automated highway for one direction. The height is about 40 cm above the pavement. A RSU should be perpendicular to the road during installation. In some embodiments, the installation angle of RSU is as shown in FIG. 22.

Vehicle/OBU

OBU Module Design

Figure 23:
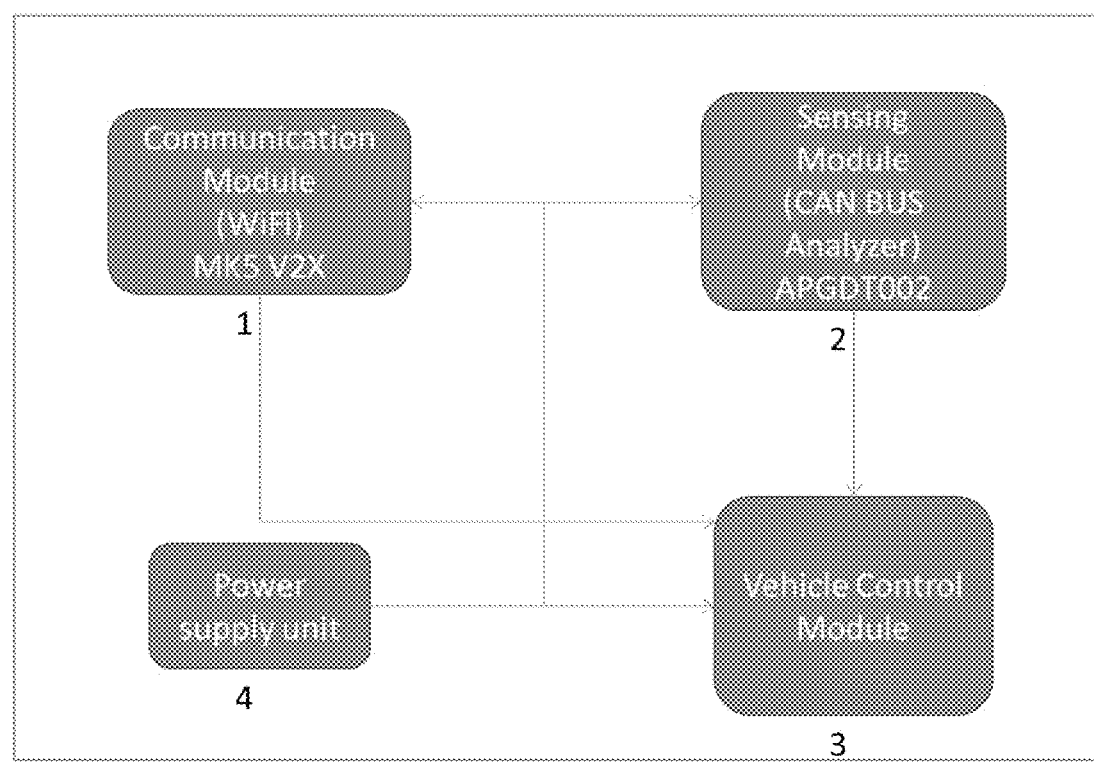
FIG. 23 illustrates an exemplary OBU module design.

Description of an Example of OBU (FIG. 23).

The communication module (1) is used to receive both information and command instruction from a RSU. The data collection module (2) is used to monitor the operational state, and the vehicle control module (3) is used to execute control command.

Communication Module

OBU Installation

Technical Specifications:

Standard Conformance: IEEE 802.11p—2010

Bandwidth: 10 MHz

Data Rates: 10 Mbps

Antenna Diversity CDD Transmit Diversity

Environmental Operating Ranges: −40° C. to +55° C.

Frequency Band: 5 GHz

Doppler Spread: 800 km/h

Delay Spread: 1500 ns

Power Supply: 12/24V

Exemplary on-market components that may be employed are:

A. MK5 V2X from Cohda Wireless http://cohdawireless.com/

B. StreetWAVE from Savari http://savari.net/technology/road-side-unit/

Data Collection Module

The data collection module is used to monitor the vehicle operation and diagnosis.

OBU_TYPE_A (CAN BUS Analyzer)

Hardware technical Specifications

Intuitive PC User Interface for functions such as configuration, trace, transmit, filter, log etc.

High data transfer rate

Exemplary on-market components that may be employed are:

A. APGDT002, Microchip Technology Inc.

http://www.microchip.com/

B. Vector CANalyzer9.0 from vector https://vector.com

Software Technical Specifications

Tachograph Driver alerts and remote analysis.

Real-Time CAN BUS statistics.

$CO_2$ Emissions reporting.

Exemplary on-market components that may be employed are: CAN BUS ANALYZER USB V2.0

Vehicle Control Module

Remote Control System

Technical Specifications

Low power consumption

Reliable longitudinal and lateral vehicle control

Exemplary on-market components that may be employed are: Toyota's remote controlled autonomous vehicle. In Toyota's system, the captured data can be sent to a remote operator. The remote operator can manually operate the vehicle remotely or issue commands to the autonomous vehicle to be executed by various vehicle systems. (See e.g., U.S. Pat. No. 9,494,935 B2, herein incorporated by reference in its entirety).

Installation

OBU_TYPE_A (CAN BUS Analyzer)

Connect the tool to the CAN network using the DB9 connector or the screw in terminals

TCU/TCC

Figure 24:
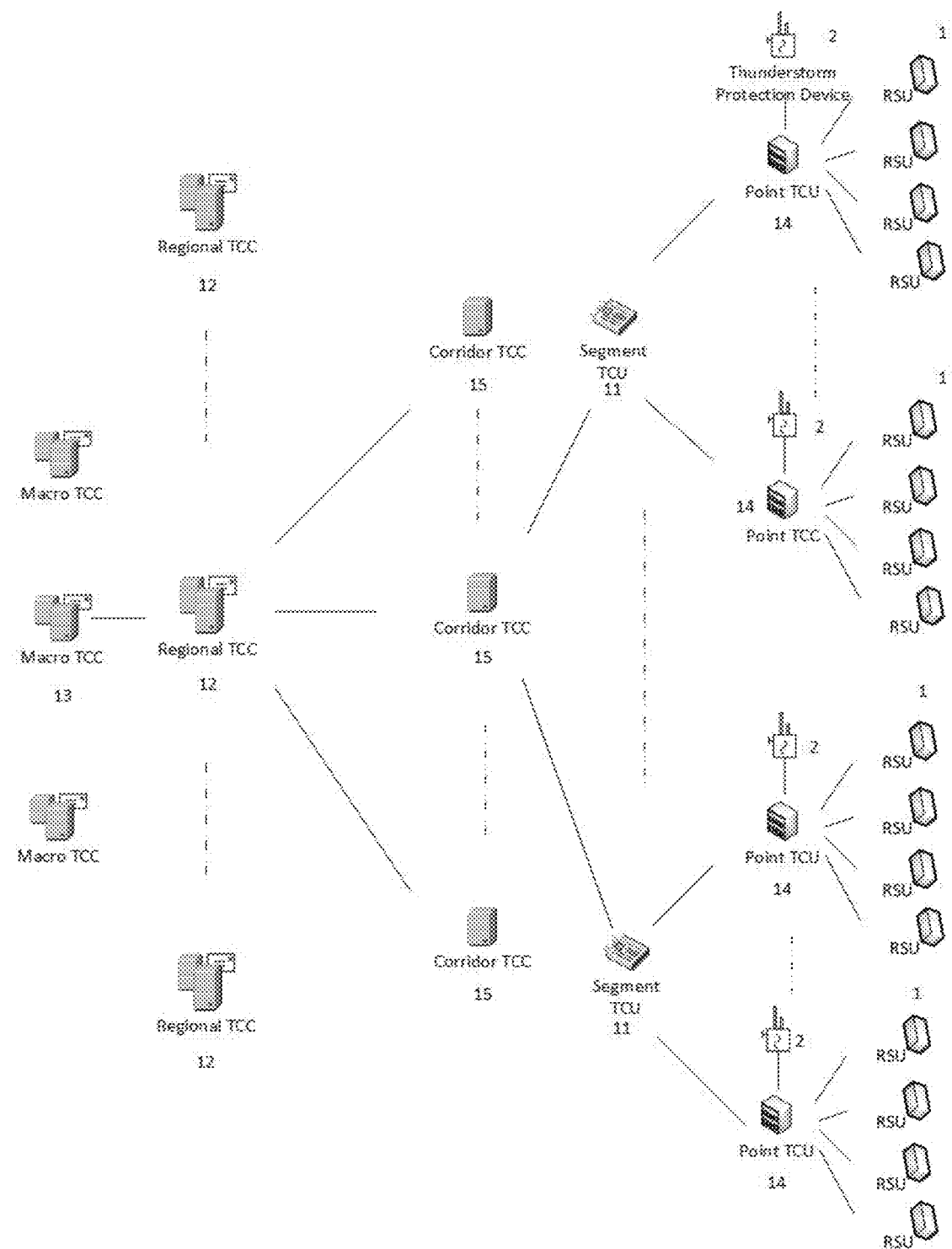
FIG. 24 illustrates an exemplary TCC/TCU structure map.

See e.g., FIG. 24. The TCC/TCU system is a hierarchy of traffic control centers (TCCs) and traffic control units (TCUs), which process information and give traffic operations instructions. TCCs are automatic or semi-automated computational centers that focus on data gathering, information processing, network optimization, and traffic control signals for a region that is larger than short road segments. TCUs are smaller traffic control units with similar functions, but covering a small freeway area, ramp metering, or intersections. There are five different types of TCC/TCU. A point TCU collects and exchanges data from several RSUs. A segment TCC collects data and exchanges data from multiple Point TCUs, optimizes the traffic flow, and controls Point TCU to provide control signal for vehicles. A Corridor TCC collects data from multiple RSUs and optimizes the traffic in a corridor. A Regional TCC collects data from multiple corridors and optimizes traffic flow and travel demand in a large area (e.g. a city is covered by one regional TCC). A Macro TCC collects data from multiple Regional TCCs and optimizes the travel demand in a large-scale area.

For each Point TCU, the data is collected from a RSU system (1). A Point TCU (14) (e.g. ATC-Model 2070L) with parallel interface collects data from a RSU. A thunderstorm protection device protects the RSU and Road Controller system. The RSU unites are equipped at the road side.

A Point TCU (14) communicates with RSUs using wire cable (optical fiber). Point TCUs are equipped at the roadside, which are protected by the Thunderstorm protector (2). Each point TCU (14) is connected with 4 RSU unites. A Point TCU contains the engineering server and data switching system (e.g. Cisco Nexus 7000). It uses data flow software.

Each Segment TCC (11) contains a LAN data switching system (e.g. Cisco Nexus 7000) and an engineering server (e.g. IBM engineering server Model 8203 and ORACL data base). The Segment TCC communicates with the Point TCC using wired cable. Each Segment TCC covers the area along 1 to 2 miles.

The Corridor TCC (15) contains a calculation server, a data warehouse, and data transfer units, with image computing ability calculating the data collected from road controller (14). The Corridor TCC controls Point TCC along a segment, (e.g., the Corridor TCC covers a highway to city street and transition). A traffic control algorithm of TCC is used to control Point TCCs (e.g., adaptive predictive traffic control algorithm). The data warehouse is a database, which is the backup of the corridor TCC (15). The Corridor TCC

(15) communicates with segment TCU (11) using wired cord. The calculation work station (KZTs-M1) calculates the data from segment TCU (15) and transfers the calculated data to Segment TCU (11). Each corridor TCC covers 5-20 miles.

Regional TCC (12). Each regional TCC (12) controls multiple Corridor TCCs in a region (e.g. covers the region of a city) (15). Regional TCCs communicate with corridor TCCs using wire cable (e.g. optical fiber).

Macro TCC (13). Each Macro TCC (13) controls multiple regional TCCs in a large-scale area (e.g., each state will have one or two Macro TCCs) (12). Macro TCCs communicate with regional TCCs using wire cable (e.g. optical fiber).

High Resolution Map and Vehicle Location

High Resolution Map

Technical Specifications

Show carriageway markings and other traffic signs that are printed on roads correctly and clearly.

As changes occur in the road network, the map will update the information by itself.

Map error is less than 10 cm with 99% confidence.

Exemplary on-market components that may be employed are:

A. HERE https://here.com/en/products-services/products/here-hd-live-map

The HD maps of HERE allow highly automated vehicles to precisely localize themselves on the road. In some embodiments, the autonomous highway system employs maps that can tell them where the curb is within a few centimeters. In some embodiments, the maps also are live and are updated second by second with information about accidents, traffic backups, and lane closures.

Differential Global Positioning System:

Hardware Technical Specifications

Locating error less than 5 cm with 99% confidence

Support GPS system

Exemplary on-market components that may be employed are:

A. Fleetmatics https://www.fleetmatics.com/

B. Teletrac Navman http://drive.teletracnavman.com/

C. Fleetmatics http://lead.fleetmatics.com/

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Certain steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

We claim:

1. An autonomous vehicle and center control (AVCC) system comprising:
    a) a TCC/TCU communication module communicating with a traffic control center/traffic control unit (TCC/TCU) and receiving vehicle-specific control instructions from the TCC/TCU; and
    b) an onboard unit (OBU) comprising a vehicle control module controlling a vehicle comprising said AVCC system according to said vehicle-specific control instructions, wherein said vehicle-specific control instructions comprise instructions for vehicle longitudinal and lateral position; speed; and steering and control.

2. The AVCC system of claim 1, wherein said vehicle-specific control instructions comprise control instructions for speed, spacing, lane designation, vehicle following, lane changing, and/or route guidance.

3. The AVCC system of claim 1, wherein said TCC/TCU communication module receives vehicle-specific information comprising weather information, pavement conditions, and/or estimated travel time.

4. The AVCC system of claim 1, wherein said vehicle transmits data to a TCC/TCU, said data comprising vehicle static information and/or vehicle dynamic information.

5. The AVCC system of claim 4, wherein said vehicle static information comprises vehicle identifier, vehicle size, vehicle type, vehicle software information, and/or vehicle hardware information.

6. The AVCC system of claim 4, wherein said vehicle dynamic information comprises a timestamp, GPS coordinates, vehicle longitudinal and lateral position, vehicle speed, and/or vehicle origin/destination information.

7. The AVCC system of claim 1, further comprising a Roadside Unit (RSU) communication module configured to communicate with an RSU.

8. The AVCC system of claim 1, further comprising a data collection module monitoring the operational state of the vehicle comprising said AVCC system.

9. The AVCC system of claim 1, further comprising an in-vehicle interface.

10. The AVCC system of claim 9, wherein said in-vehicle interface comprises an audio, visual, and/or vibration interface.

11. The AVCC system of claim 1, wherein said TCC/TCU receives data flow from vehicles, generates vehicle-specific control instructions and information, and/or sends targeted instructions to vehicles.

12. The AVCC system of claim 1, wherein said TCC/TCU provides data gathering, information processing, network optimization, and traffic control.

13. The AVCC system of claim 1, wherein said TCC/TCU communication module is configured to communicate wirelessly with one or more TCC/TCU.

14. The AVCC system of claim 1, further comprising a V2V communication module configured to communicate with a second AVCC system.

15. The AVCC system of claim 1, configured to distribute driving tasks with a TCC/TCU and RSU network.

16. The AVCC system of claim 1, wherein said TCC/TCU provides operations and maintenance services for vehicles; and/or provides predictive traffic control.

17. A connected and automated vehicle (CAV) comprising the AVCC system of claim 1.

18. The CAV of claim 17, further comprising traffic sensors and/or environment sensors.

19. The CAV of claim 17, configured to be operational on a portion of available lanes and/or all lanes of a road or highway.

20. The CAV of claim 17, configured to be controlled by a transportation management system comprising TCC/TCU, a network of RSUs, and a vehicle sub-system.

\* \* \* \* \*